(12) United States Patent
Marsal et al.

(10) Patent No.: US 10,598,082 B2
(45) Date of Patent: Mar. 24, 2020

(54) TURBINE WASTEGATE

(71) Applicant: Garrett Transportation I Inc., Torrance, CA (US)

(72) Inventors: Damien Marsal, Golbey (FR); Antonin Forbelsky, Brno (CZ); Stanislav Hahn, Brno (CZ); Filip Tomanec, Luhacovice (CZ); Vaclav Kadlec, Brno (CZ)

(73) Assignee: Garrett Transportation I Inc., Torrance, CA (US)

( * ) Notice: Subject to any disclaimer, the term of this patent is extended or adjusted under 35 U.S.C. 154(b) by 14 days.

(21) Appl. No.: 16/112,691

(22) Filed: Aug. 25, 2018

(65) Prior Publication Data

US 2020/0063649 A1 Feb. 27, 2020

(51) Int. Cl.
*F02B 37/18* (2006.01)
*F02B 37/02* (2006.01)

(52) U.S. Cl.
CPC .......... *F02B 37/183* (2013.01); *F02B 37/025* (2013.01); *F02B 37/186* (2013.01)

(58) Field of Classification Search
CPC .... F02B 37/183; F02B 37/186; F02B 37/025; Y02T 10/144; F01D 17/105; F05D 2220/40
See application file for complete search history.

(56) References Cited

U.S. PATENT DOCUMENTS

| | | |
|---|---|---|
| 3,060,961 A | 10/1962 | Conley |
| 3,383,092 A | 5/1968 | Cazier |
| 4,274,436 A | 6/1981 | Smith |
| 4,872,480 A | 10/1989 | Scaramucci |
| 8,096,754 B2 * | 1/2012 | Naemura ............. F01D 17/105 415/144 |
| 8,459,022 B2 | 6/2013 | Cizek |
| 8,499,747 B2 | 8/2013 | Schmalzl |
| 8,950,731 B2 * | 2/2015 | Ishihata ................ F16K 1/42 251/301 |

(Continued)

FOREIGN PATENT DOCUMENTS

| | | |
|---|---|---|
| DE | 12 56 019 | 12/1967 |
| DE | 38 39 968 A1 | 5/1990 |

(Continued)

OTHER PUBLICATIONS

Special Metals, INCONEL alloy 718, Pub. No. SMC-045, Sep. 2007 (28 pages).

(Continued)

*Primary Examiner* — Jesse S Bogue
(74) *Attorney, Agent, or Firm* — Brian J. Pangrle

(57) ABSTRACT

An assembly can include a turbine housing that includes a bore, a wastegate seat, wastegate passages that extend to the wastegate seat and a divider wall disposed between the wastegate passages where the divider wall includes a divider wall surface; a rotatable wastegate shaft configured for receipt by the bore; a wastegate arm extending from the wastegate shaft; and a wastegate plug extending from the wastegate arm where the wastegate plug includes a contact portion that contacts the wastegate seat to cover the wastegate passages in a closed state and a mesh that contacts the divider wall surface in the closed state.

20 Claims, 19 Drawing Sheets

(56) References Cited

U.S. PATENT DOCUMENTS

| | | | | |
|---|---|---|---|---|
| 8,984,880 | B2* | 3/2015 | Marques | F01D 17/10 |
| | | | | 60/602 |
| 9,200,532 | B2* | 12/2015 | Palaniyappan | F16K 1/2014 |
| 10,030,518 | B2* | 7/2018 | Lummer | F02B 33/40 |
| 10,060,536 | B2* | 8/2018 | Cizek | F02B 39/00 |
| 10,138,803 | B2* | 11/2018 | Miazgowicz | F02B 37/186 |
| 2011/0175025 | A1* | 7/2011 | Schall | F01D 17/105 |
| | | | | 252/182.33 |
| 2018/0328217 | A1* | 11/2018 | Walkingshaw | F01D 17/105 |
| 2019/0072030 | A1* | 3/2019 | Walkingshaw | F01D 17/105 |
| 2019/0178150 | A1* | 6/2019 | Mehne | F01D 17/105 |

FOREIGN PATENT DOCUMENTS

| | | | |
|---|---|---|---|
| EP | 1988265 | A1 | 11/2008 |
| EP | 2444626 | A1 | 4/2012 |

OTHER PUBLICATIONS

Special Metals, INCONEL alloy 601, Pub. No. SMC-028, Feb. 2005 (16 pages).

* cited by examiner

C-C

1410

1420

1430

Method 1800

Using Tool, Position Mesh with respect to Recess of Plug
1810

Compress Mesh to Force Mesh into Recess of Plug
1820

Produce Assembly of Plug with Mesh in Recess
1830

TURBINE WASTEGATE

TECHNICAL FIELD

Subject matter disclosed herein relates generally to turbomachinery for internal combustion engines and, in particular, to turbine wastegates for turbochargers.

BACKGROUND

A turbine wastegate is type of a valve that can be controlled to selectively allow at least some exhaust to bypass a turbine. Where an exhaust turbine drives a compressor for boosting inlet pressure to an internal combustion engine (e.g., as in a turbocharger), a wastegate provides a means to control the boost pressure.

A so-called internal wastegate is integrated at least partially into a turbine housing. An internal wastegate may be configured as a type of flapper valve that includes a flapper, which may be referred to as a plug, where the plug is controllable via rotation of a shaft where an arm may extend from the shaft to the plug. The shaft can be rotatable via actuation of an actuator, which may be mechanical, electrical, etc. A mechanical linkage may operatively couple the actuator to the shaft, for example, via a shaft control arm. A plug of a wastegate often includes a flat disk shaped surface that seats against a flat seat (e.g., a valve seat or wastegate seat) disposed about an exhaust bypass opening.

In a closed position, a wastegate plug should be seated against a wastegate seat (e.g., seating surface) with sufficient force to effectively seal an exhaust bypass opening (e.g., to prevent leaking of exhaust from a high pressure exhaust supply to a lower pressure region). Often, an internal wastegate is configured to transmit force from an arm to a plug. During engine operation, load requirements for a wastegate vary with pressure differential. High load requirements can generate high mechanical stresses in a wastegate's kinematics components, a fact which has led in some instances to significantly oversized component design to meet reliability levels (e.g., as demanded by engine manufacturers). Reliability of wastegate components is a concern for diesel engine applications and for gasoline engine applications; noting that exhaust temperatures can be higher for gasoline engines. In both diesel engines and gasoline engines, exhaust pulsation can be a concern, particularly where a turbine housing receives exhaust via a plurality of passages where each passage can be dedicated to receipt of exhaust from particular combustion cylinders of an engine. Such a turbine housing can include multiple scrolls where each scroll can be dedicated to receipt of exhaust from particular combustion cylinders of an engine.

Various examples of wastegates and wastegate components are described herein, which can optionally provide for improved kinematics, reduced exhaust leakage, etc.

BRIEF DESCRIPTION OF THE DRAWINGS

A more complete understanding of the various methods, devices, assemblies, systems, arrangements, etc., described herein, and equivalents thereof, may be had by reference to the following detailed description when taken in conjunction with examples shown in the accompanying drawings where.

DETAILED DESCRIPTION

Figure 1:
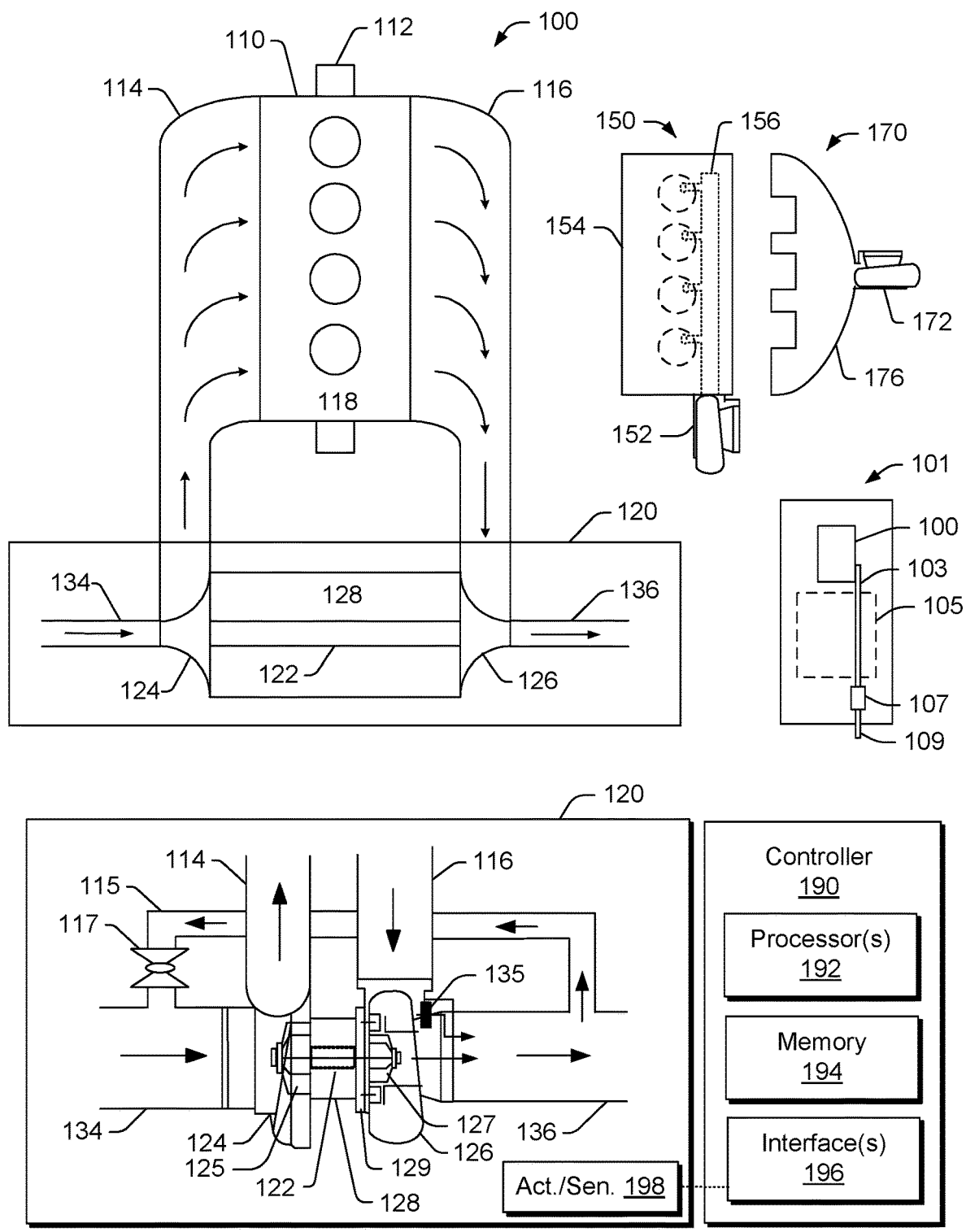
FIG. 1 is a diagram of a turbocharger and an internal combustion engine along with a controller.

Turbochargers are frequently utilized to increase output of an internal combustion engine. Referring to FIG. 1, as an example, a system 100 can include an internal combustion engine 110 and a turbocharger 120. As shown in FIG. 1, the system 100 may be part of a vehicle 101 where the system 100 is disposed in an engine compartment and connected to an exhaust conduit 103 that directs exhaust to an exhaust outlet 109, for example, located behind a passenger compartment 105. In the example of FIG. 1, a treatment unit 107 may be provided to treat exhaust (e.g., to reduce emissions via catalytic conversion of molecules, etc.).

As shown in FIG. 1, the internal combustion engine 110 includes an engine block 118 housing one or more combustion chambers that operatively drive a shaft 112 (e.g., via pistons) as well as an intake port 114 that provides a flow path for air to the engine block 118 and an exhaust port 116 that provides a flow path for exhaust from the engine block 118.

The turbocharger 120 can act to extract energy from the exhaust and to provide energy to intake air, which may be combined with fuel to form combustion gas. As shown in FIG. 1, the turbocharger 120 includes an air inlet 134, a shaft 122, a compressor housing assembly 124 for a compressor wheel 125, a turbine housing assembly 126 for a turbine wheel 127, another housing assembly 128 and an exhaust outlet 136. The housing 128 may be referred to as a center housing assembly as it is disposed between the compressor housing assembly 124 and the turbine housing assembly 126. The shaft 122 may be a shaft assembly that includes a variety of components. The shaft 122 may be rotatably supported by a bearing system (e.g., journal bearing(s), rolling element bearing(s), etc.) disposed in the housing assembly 128 (e.g., in a bore defined by one or more bore walls) such that rotation of the turbine wheel 127 causes rotation of the compressor wheel 125 (e.g., as rotatably coupled by the shaft 122). As an example a center housing rotating assembly (CHRA) can include the compressor wheel 125, the turbine wheel 127, the shaft 122, the housing assembly 128 and various other components (e.g., a compressor side plate disposed at an axial location between the compressor wheel 125 and the housing assembly 128).

In the example of FIG. 1, a variable geometry assembly 129 is shown as being, in part, disposed between the housing assembly 128 and the housing assembly 126. Such a variable geometry assembly may include vanes or other components to vary geometry of passages that lead to a turbine wheel space in the turbine housing assembly 126. As an example, a variable geometry compressor assembly may be provided.

In the example of FIG. 1, a wastegate valve (or simply wastegate) 135 is positioned proximate to an exhaust inlet of the turbine housing assembly 126. The wastegate valve 135 can be controlled to allow at least some exhaust from the exhaust port 116 to bypass the turbine wheel 127. Various wastegates, wastegate components, etc., may be applied to a conventional fixed nozzle turbine, a fixed-vaned nozzle turbine, a variable nozzle turbine, a twin scroll turbocharger, etc.

In the example of FIG. 1, an exhaust gas recirculation (EGR) conduit 115 is also shown, which may be provided, optionally with one or more valves 117, for example, to allow exhaust to flow to a position upstream the compressor wheel 125.

FIG. 1 also shows an example arrangement 150 for flow of exhaust to an exhaust turbine housing assembly 152 and another example arrangement 170 for flow of exhaust to an exhaust turbine housing assembly 172. In the arrangement 150, a cylinder head 154 includes passages 156 within to direct exhaust from cylinders to the turbine housing assembly 152 while in the arrangement 170, a manifold 176 provides for mounting of the turbine housing assembly 172, for example, without any separate, intermediate length of exhaust piping. In the example arrangements 150 and 170, the turbine housing assemblies 152 and 172 may be configured for use with a wastegate, variable geometry assembly, etc.

In FIG. 1, an example of a controller 190 is shown as including one or more processors 192, memory 194 and one or more interfaces 196. Such a controller may include circuitry such as circuitry of an engine control unit (ECU). As described herein, various methods or techniques may optionally be implemented in conjunction with a controller, for example, through control logic. Control logic may depend on one or more engine operating conditions (e.g., turbo rpm, engine rpm, temperature, load, lubricant, cooling, etc.). For example, sensors may transmit information to the controller 190 via the one or more interfaces 196. Control logic may rely on such information and, in turn, the controller 190 may output control signals to control engine operation. The controller 190 may be configured to control lubricant flow, temperature, a variable geometry assembly (e.g., variable geometry compressor or turbine), a wastegate (e.g., via an actuator), an electric motor, or one or more other components associated with an engine, a turbocharger (or turbochargers), etc. As an example, the turbocharger 120 may include one or more actuators and/or one or more sensors 198 that may be, for example, coupled to an interface or interfaces 196 of the controller 190. As an example, the wastegate 135 may be controlled by a controller that includes an actuator responsive to an electrical signal, a pressure signal, etc. As an example, an actuator for a wastegate may be a mechanical actuator, for example, that may operate without a need for electrical power (e.g., consider a mechanical actuator configured to respond to a pressure signal supplied via a conduit).

Figure 2:
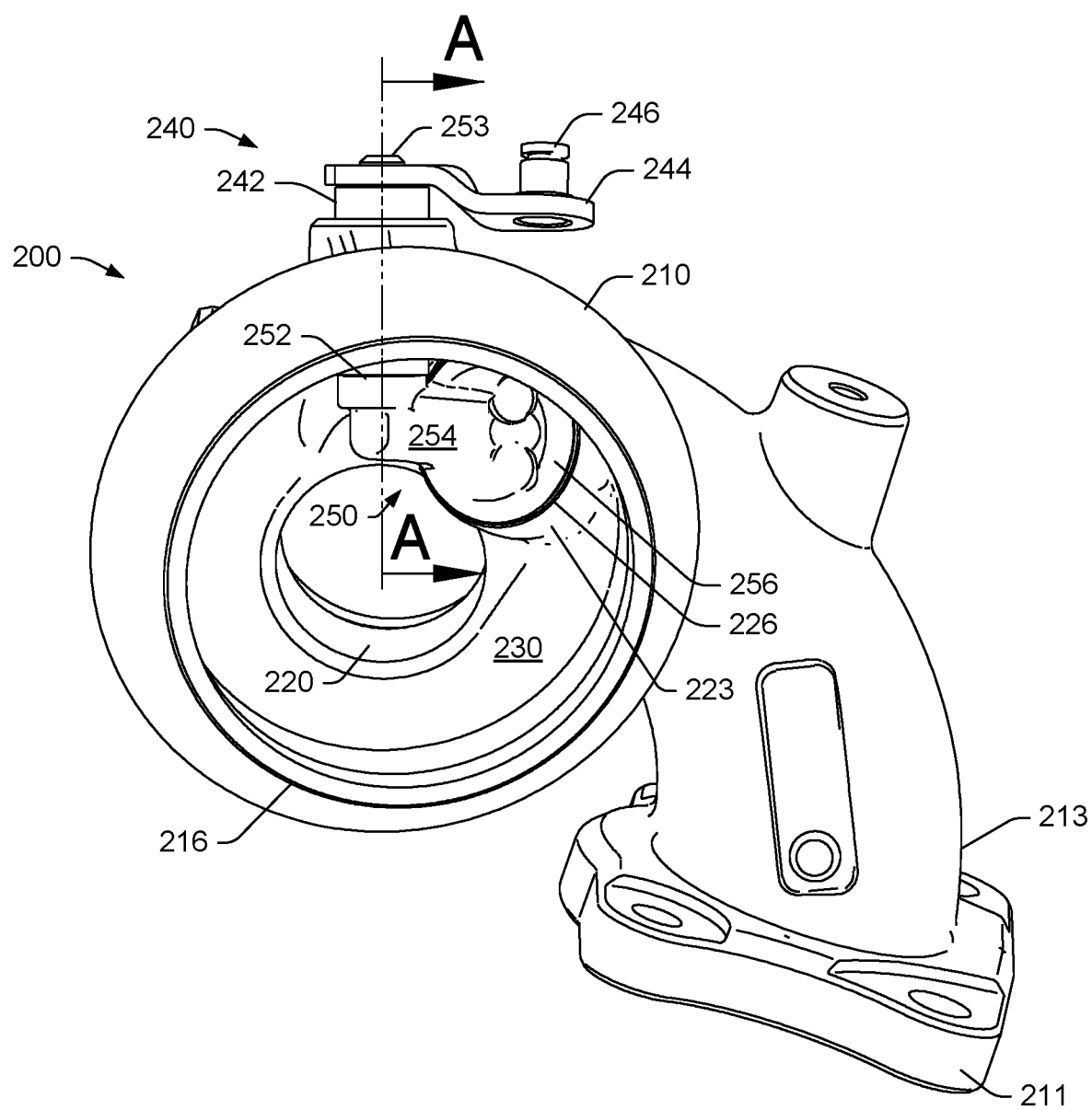
FIG. 2 is a view of an example of an assembly that includes a wastegate.
Figure 3:
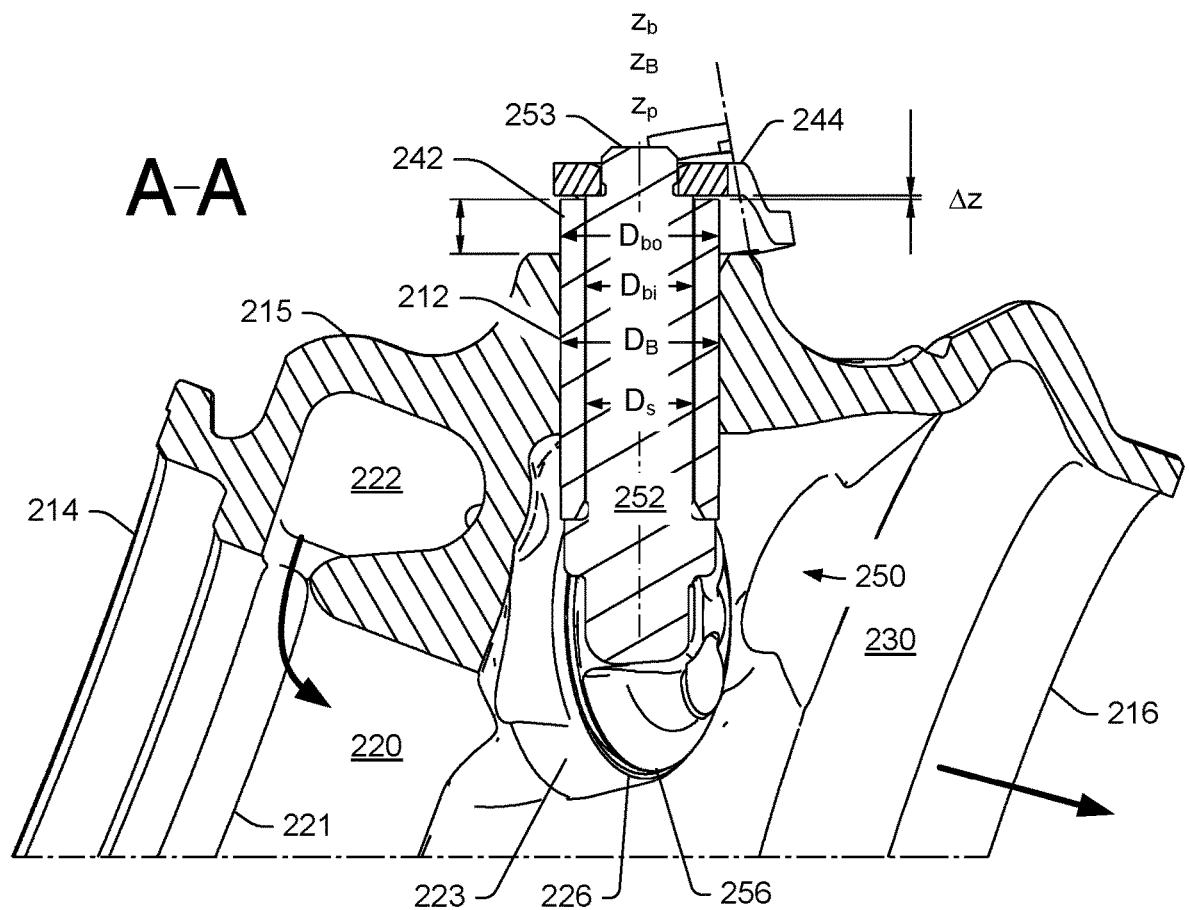
FIG. 3 is a cross-sectional view of the example of the assembly of FIG. 2 along a line A-A.

FIGS. 2 and 3 show an example of an assembly 200 that includes a turbine housing 210 that includes a flange 211, a bore 212, an inlet conduit 213, a turbine wheel opening 214, a spiral wall 215, a nozzle 221, a volute 222 formed in part by the spiral wall 215, a wastegate wall 223 that extends to a wastegate seat 226, and an exhaust chamber 230. In the example of FIG. 2, the turbine housing 210 may be a single piece or multi-piece housing. As an example, the turbine housing 210 may be a cast component (e.g., formed via sand casting or other casting process). The turbine housing 210 includes various walls, which can define features such as the bore 212, the turbine wheel opening 214, the exhaust outlet opening 216, the chamber 230, etc. In particular, the wastegate wall 223 defines a wastegate passage in fluid communication with the inlet conduit 213 where a wastegate control linkage 240 and a wastegate arm and plug 250 are configured for opening and closing the wastegate passage (e.g., for wastegating exhaust).

In the example of FIG. 2, the wastegate control linkage 240 includes a bushing 242 configured for receipt by the bore 212 of the turbine housing 210, a control arm 244 and a peg 246 and the wastegate arm and plug 250 includes a shaft 252, a shaft end 253, an arm 254 and a plug 256. As shown, the bushing 242 is disposed between the bore 212 and the shaft 252, for example, to support rotation of the shaft 252, to seal the chamber 230 from an exterior space, etc. The bore 212, the bushing 242 and the shaft 252 may each be defined by a diameter or diameters as well as one or more lengths. For example, the shaft 252 includes a diameter $D_s$, the bore 212 includes a diameter $D_B$ while the bushing 242 includes an inner diameter $D_{bi}$ and an outer diameter $D_{bo}$. In the example of FIG. 2, when the various components are assembled, the diameters may be as follows: $D_B > D_{bo} > D_{bi} > D_s$. As to lengths, a length of the shaft 252 exceeds a length of the bushing 242, which exceeds a length of the bore 212. Such lengths may be defined with respect to a shaft axis $z_s$, a bushing axis $z_b$ and a bore axis $z_B$. As shown, the bushing 242 is disposed axially between a shoulder of the shaft 252 and the control arm 244 of the control linkage 240.

In the example of FIG. 2, a gap $\Delta z$ is shown between a surface of the bushing 242 and a surface of the control arm 244, which allows for axial movement of the shaft 252, for example, to facilitate self-centering of the plug 256 with respect to the wastegate seat 226.

As an example, the assembly 200 may be fitted to an exhaust conduit or other component of an internal combustion engine (see, e.g., examples of FIG. 1) via the flange 211 such that exhaust is received via the inlet conduit 213, directed to the volute 222. From the volute 222, exhaust is directed via the nozzle 221 to a turbine wheel disposed in the turbine housing 210 via the opening 214 to flow and expand in a turbine wheel space defined in part by the shroud wall 220. Exhaust can then exit the turbine wheel space by flowing to the chamber 230 and then out of the turbine housing 210 via the exhaust outlet opening 216.

As to wastegating, upon actuation of the control linkage 240 (e.g., by an actuator coupled to the peg 246), the wastegate arm and plug 250 may be rotated such that at least a portion of the received exhaust can flow in the wastegate passage defined by the wastegate wall 223, past the wastegate seat 226 and into the chamber 230, rather than through the nozzle 221 to the turbine wheel space. The wastegated portion of the exhaust may then exit the turbine housing 210 via the exhaust outlet opening 216 (e.g., and pass to an exhaust system of a vehicle, be recirculated in part, etc.).

As an example, the control linkage 240 may exert a force that acts to force the plug 256 in a direction toward the wastegate seat 226. For example, an actuator may include a biasing mechanism (e.g., a spring, etc.) that exerts force, which may be controllably overcome, at least in part, for rotating the plug 256 away from the wastegate seat 226 (e.g., for wastegating). As an example, an actuator may be mounted to a turbocharger (e.g., mounted to a compressor assembly, etc.). As an example, an actuator may be a linear actuator, for example, that includes a rod that moves along an axis. Depending on orientation of a plug, a shaft, a control linkage and such a rod, to maintain the plug in a closed position, the rod may exert a downward force (e.g., away from the control linkage as in the example of FIG. 2) or the rod may exert an upward force (e.g., toward the control linkage). For example, where the control arm 244 (e.g., and the peg 246) of the control linkage 240 are oriented on the same "side" as the plug 256 with respect to the shaft 252, a downward force applied to the control arm 244 (e.g., via the peg 246) may act to maintain the plug 256 in a closed position with respect to the wastegate seat 226; whereas, where, for example, an approximately 180 degree span exists between a plug and a control arm, an upward force applied to the control arm may act to maintain the plug in a closed position with respect to a wastegate seat.

As an example, a rod of an actuator may be biased to exert a force on a control linkage that causes the control linkage to exert a force on a plug (see, e.g., the plug 256) such that the plug seats against a wastegate seat (see, e.g., the wastegate seat 226). In such an example, the actuator may at least in part overcome the force that biases the rod such that a shaft rotates the plug away from the wastegate seat. For example, in FIG. 2, to initiate wastegating, the entire plug 256 rotates about an axis of the shaft 252 and moves away from the wastegate seat 226 (e.g., without any portion of the plug 256 moving into a wastegate opening defined by the wastegate seat 226). As an example, the moving away of the plug 256 may be facilitated by exhaust pressure. For example, in a closed position, the plug 256 experiences a pressure differential where pressure is higher below the plug 256 and less above the plug 256. In such an example, the pressure below the plug 256 acts in a direction that is countered by the closing force applied to the plug 256 via the control linkage 240 (e.g., the pressure differential acts to bias the plug 256 toward an open position). Accordingly, the closing force applied to the plug 256 should overcome pressure force from below the plug 256. Further, where the shaft 252 may include some play (see, e.g., $\Delta z$, etc.), the closing force applied to the plug 256 may cause the plug 256 to self-center with respect to the wastegate seat 226 (e.g., to facilitate sealing, to avoid exhaust leakage, etc.).

In the example of FIG. 2, the axes of the bore 212, the bushing 242 and the shaft 252 are shown as being aligned (e.g., defining a common axis), however, during assembly, operation, etc., some misalignment may occur. For example, over time, clearances between the various components (e.g., plug, arm, shaft, bore, bushing, etc.) can change. Forces that can cause such change include aerodynamic excitation, high temperatures, temperature cycling (e.g., temperatures <−20 degrees C. to >1000 degrees C.), chemical attack, friction, deterioration of materials, etc. For at least the foregoing reasons, it can be difficult to maintain effective sealing of a wastegate opening over the lifetime of an exhaust turbine assembly. As to temperature, problems at high temperatures generally include wear and loss of function and consequently leakage, lack of controllability or a combination of leakage and uncontrollability.

As an example, a plug may include a contact portion. For example, a plug may include a radiused portion as a contact portion that contacts a surface of a wastegate seat in a closed state. As an example, in an assembly, such a plug may be configured to self-center with respect to a wastegate seat (e.g., in a closed state). As an example, a surface of a wastegate seat may be conical, which may facilitate self-centering of a contact portion of a plug. As an example, one or more clearances may exist in an assembly for a wastegate shaft with respect to a bushing such that the wastegate shaft may move in a manner that allows for self-centering of a wastegate plug, operatively coupled to the wastegate shaft, with respect to a wastegate seat.

In the example of FIG. 2, the turbine housing 210 may be a single piece or multi-piece housing. As an example, the turbine housing 210 may be a cast component (e.g., formed via sand casting or other casting process). The turbine housing 210 includes various walls, which can define features such as the bore 212, a turbine wheel opening, the exhaust outlet opening 216, the chamber 230, etc.

As an example, the wastegate arm and plug 250 may be a unitary wastegate arm and plug (e.g., a monoblock wastegate arm and plug) or a wastegate arm and plug assembly. In contrast, a multicomponent arm and plug assembly includes interfaces between components. Such interfaces may be subject to wear, deformation, etc., which may interfere with proper operation over time.

Figure 4:
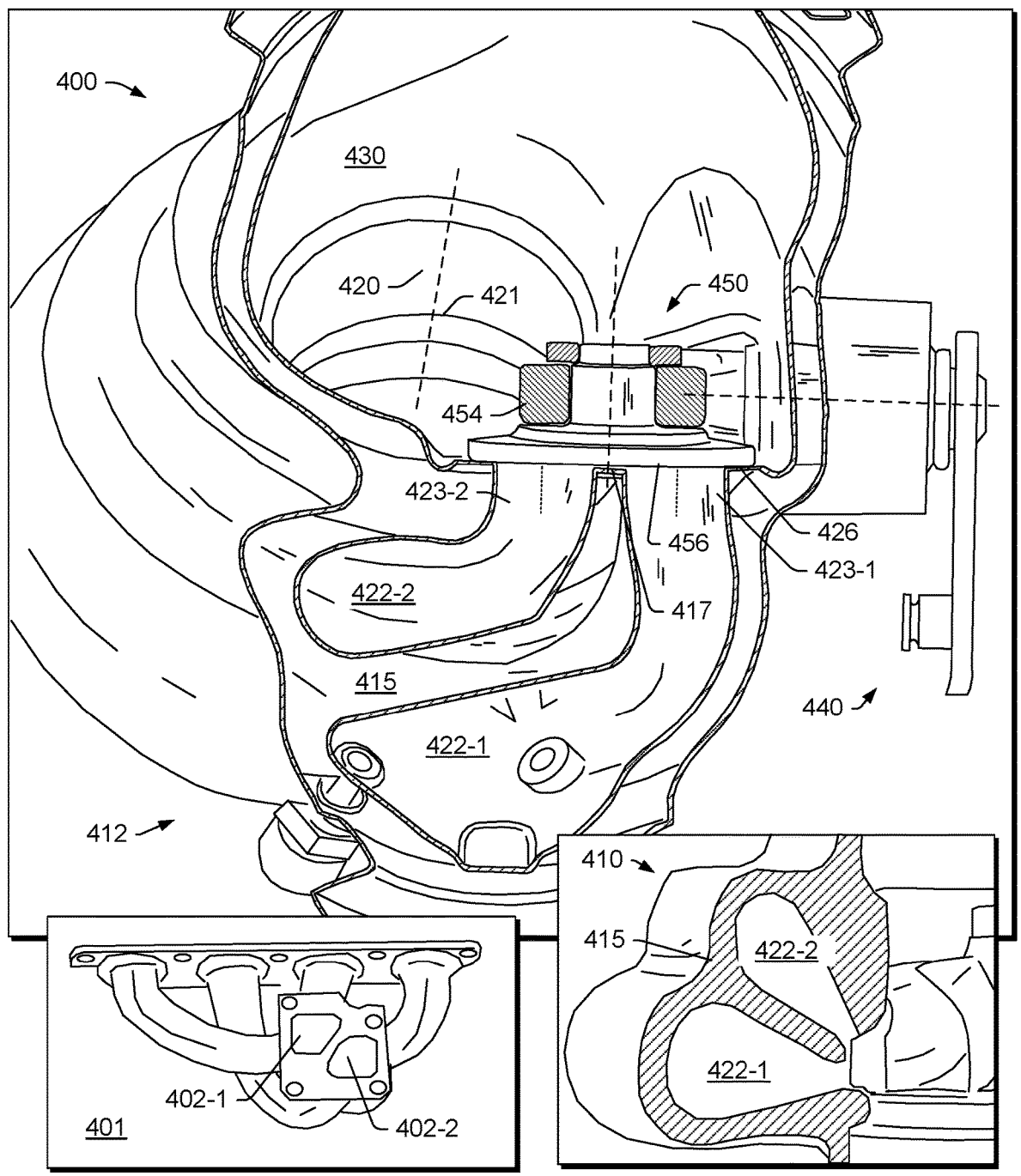
FIG. 4 is a series of views of an example of an assembly that includes two scrolls along with an example of an exhaust manifold.

FIG. 4 shows an example of a twin scroll turbine assembly 400 that may be configured to receive exhaust from a manifold 401 that includes a two separate exhaust passages, each with its own opening 402-1 and 402-2. The view of the assembly 400 of FIG. 4 is shown as a "see-through" cutaway view where solid walls may be shown as being hollow, for example, to more clearly illustrate contours of such walls, shapes of passages, etc.

As an example, the manifold 401 may be considered a divided manifold that separates flow of exhaust from cylinders whose cycles may interfere with one another (e.g., as to exhaust pulse energy). For example, on a four-cylinder engine with firing order 1-3-4-2, cylinder #1 is ending its expansion stroke and opening its exhaust valve while cylinder #2 still has its exhaust valve open (cylinder #2 is in its overlap period). In an undivided exhaust manifold, a pressure pulse from cylinder #1's exhaust blowdown event may be more likely to contaminate cylinder #2 with high pressure exhaust gas, which can impact performance of cylinder #2's (e.g., ability to breathe properly) and diminish pulse energy that may have been better utilized in by a turbine. As an example, a proper grouping for the aforementioned engine may keep complementary cylinders grouped together (e.g., exhaust of cylinders #1 and #4 as one complementary group and cylinders #2 and #3 as another complementary group). Such an approach may better utilize exhaust pulse energy and, for example, improve turbine performance (e.g., increase boost more rapidly).

As shown in FIG. 4, the assembly 400 includes a housing 410 that includes a wall 415 that defines two scrolls 422-1 and 422-2 (e.g., two volutes) that can direct exhaust to a turbine wheel space, for example, via a nozzle or nozzles 421. As an example, a turbine wheel space may be defined in part by a shroud wall 420 located axially above the nozzle or nozzles 421 that extends axially to an exhaust chamber 430.

In the example of FIG. 4, the housing 410 includes two wastegate walls 423-1 and 423-2 associated with respective scrolls 422-1 and 422-2. The two wastegate walls 423-1 and 423-2 form openings about which exists a wastegate seat 426. As shown, the wastegate wall 423-1 defines a first wastegate passage in fluid communication with a first inlet conduit and the wastegate wall 423-2 defines a second wastegate passage in fluid communication with a second inlet conduit where, for example, the inlet conduits may be operatively coupled to respective openings 402-1 and 402-2 of the manifold 401. As an example, the manifold 176 of FIG. 1 may be configured to be a divided manifold, for example, where the turbine housing assembly 172 may include twin scrolls (e.g., two volutes). As an example, the cylinder head 154 of FIG. 1 may include divided passages, for example, where the turbine housing assembly 152 may include twin scrolls (e.g., two volutes).

For control of exhaust flow through the wastegate passages, the assembly 400 includes a wastegate control linkage 440 and a wastegate arm and plug 450 with an arm component 454 and a plug component 456 that are configured for opening and closing the wastegate passages (e.g., for wastegating exhaust) via seating of the plug component 456 with respect to the wastegate seat 426.

The assembly 400 may be described, for example, with respect to various axes. For example, consider an axis of a turbine wheel space that may coincide with a rotational axis of a turbine wheel, an axis of a shaft of the wastegate arm and plug 450 and an axis of the plug component 456. Further, each of the openings of the wastegate passages may be defined by a respective axis, for example, where in a closed state of the wastegate, the axis of the plug component 456 is approximately aligned parallel to the axes of the openings of the wastegate passages.

Referring again to the assembly 400, pulse energy may differ in the two passages 423-1 and 423-2 such that one portion of the plug component 456 experiences different force than another portion of the plug 456. Such differences can be due to the configuration of the manifold 401 where one of the passages 423-1 and 423-2 receives exhaust from one of the openings 402-1 and 402-2 and where the other of the passages 423-1 and 423-2 receives exhaust from the other of the openings 402-1 and 402-2. Such differences in pulse energy in the two passages 423-1 and 423-2 may cause vibration, misalignment, wear, etc. For example, as the plug component 456 includes a stem seated in an opening of the arm component 454, pressure may cause the plug component 456 to tilt such that an axis of the stem misaligns with respect to an axis of the opening of the arm component 454. Over time, wear may occur (e.g., increased clearances), which may exacerbate wear, leakage, etc.

As to leakage, leakage may occur from a passage to the chamber 430 and/or from one passage to another passage (e.g., and vice versa). For example, due to a pressure difference between the passages, exhaust may flow from the passage formed by the wall 423-1 to the passage formed by the wall 423-2 in a space above a divider wall surface 417 and the plug component 456. Such flow may act to "equalize" pressures, which may, for example, be detrimental to a divided manifold approach (e.g., or a twin scroll approach). Such flow may be referred to as scroll-to-scroll leakage that occurs for a closed operational state of a wastegate arm and plug (e.g., where a controller, actuator, etc. calls for the passages to be closed).

Figure 5:
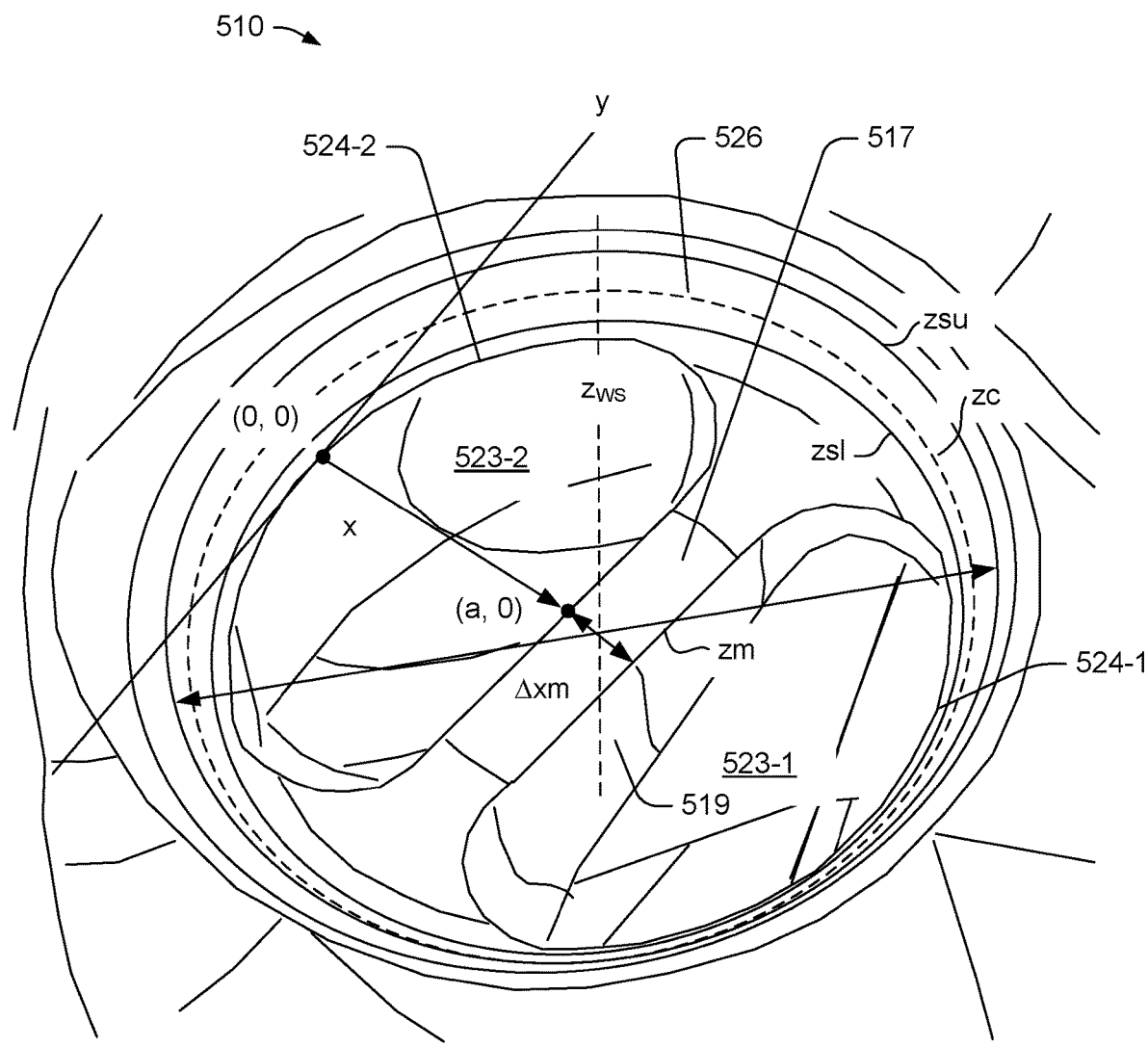
FIG. 5 is a perspective view of a portion of a turbine housing that includes two scrolls.

FIG. 5 shows an example of a turbine housing 510 that includes a divider wall surface 517 of a divider wall 519, wastegate seat 526 and exhaust passages 523-1 and 523-2 where the divider wall 519 is disposed between the passages 523-1 and 523-2 and where the passage 523-1 includes a corresponding opening 524-1 and where the passage 523-2 includes a corresponding opening 524-2. The divider wall 519 can be described as dividing the passages 523-1 and 523-2. The divider wall 519 is shown as defining a portion of the opening 524-1 and as defining a portion of the opening 524-2.

The shape of the opening 524-1 and the shape of the opening 524-2 may be defined geometrically (e.g., mathematically) as a type of a bean curve. For example, consider a quartic curve given by the implicit equation:

$$x^4 + x^2 y^2 + y^4 = ax(x^2 + y^2)$$

The forgoing equation can generate a curve with horizontal tangents at ⅔ a, +/−⅔ a and vertical tangents at (0, 0) and (a, 0). In FIG. 5, the opening 524-2 is shown with x and y axes with vertical tangents at (0, 0) and (a, 0), noting that horizontal tangents may be defined at +/−values of y at a distance along the x axis. As shown, the divider wall surface 517 can be defined at least in part by a tangent of the opening 524-1 and at least in part by a tangent of the opening 524-2, which may be utilized to define a divider wall surface width Δxm. The divider wall surface 517 can also be defined by a length with respect to the y axis, which may be denoted Δym.

In the example of FIG. 5, the wastegate seat 526 includes a lower perimeter at zsl and an upper perimeter at zsu, where an axis $z_{ws}$ (z axis as to the wastegate seat or "ws") can be increasing in a direction from the passages 523-1 and 523-2 toward an exhaust chamber. As shown, the divider wall surface 517 can be defined by one or more z coordinates. In the example of FIG. 5, the divider wall surface can include a relatively planar portion at zm with width Δxm and length Δym. In the example of FIG. 5, zsl (surface lower or "sl") can be greater than zm and zsu (surface upper or "su") is greater than zsl. A plug can contact the wastegate seat 526 to form a contact perimeter zc that is at a z coordinate that is greater than zsl and less than zsu. FIG. 5 shows an example of zc as a dashed line, which may be defined by a radius or a diameter as measured from the axis $z_{ws}$ (e.g., where a plug is centered with respect to the wastegate seat 526); noting that zsl and zsu may each correspond to a radius or a diameter as measured from the axis $z_{ws}$.

In the example of FIG. 5, the wastegate seat 526 can be conical where zsl is a lower portion of a cone and zsu is an upper portion of a cone where a cone angle can be defined by the distance between zsl and zsu and a difference in radii or diameters; where the radius or diameter is greater at zsu than at zsl. A cone angle can be discerned in FIG. 6 (see, e.g., M.

As an example, a wastegate seat can be disposed adjacent to openings and a divider wall surface where each of the openings and at least a portion of the divider wall surface may be defined by a bean curve. In such an example, the divider wall surface may be defined in part by two bean curves. As an example, a divider wall surface may be defined at least in part by a plane.

Figure 6:
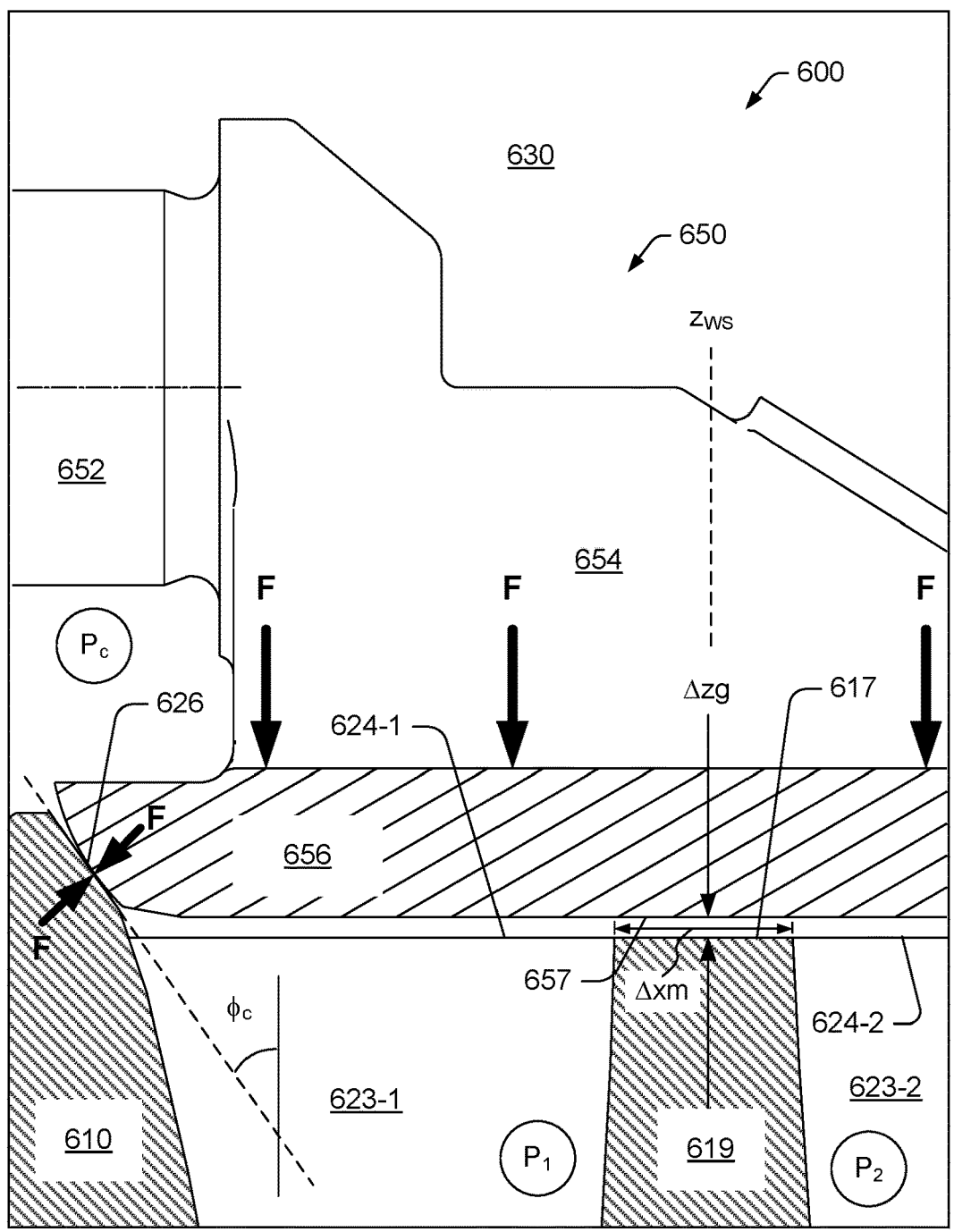
FIG. 6 is a cross-sectional view of a portion of an assembly that illustrates a gap between a divider wall and a plug.

FIG. 6 shows an example of a portion of an assembly 600 that includes a turbine housing 610, a divider wall 619 that includes a divider wall surface 617, passages 623-1 and 623-2 that include corresponding openings 624-1 and 624-2, a wastegate seat 626, an exhaust chamber 630, and a wastegate 650 that includes a shaft 652, an arm 654 and a plug 656 where the plug 656 is in contact with the wastegate seat 626 such that the wastegate is in a closed orientation or closed state to hinder flow of exhaust from the passages 623-1 and 623-2 through their corresponding openings 624-1 and 624-2 to the exhaust chamber 630.

FIG. 6 also shows three pressures, $P_c$ as to a chamber pressure, $P_1$ as to a pressure in the passage 623-1 and $P_2$ as to a pressure in the passage 623-2; noting that during operation, at least the pressures $P_1$ and $P_2$ can vary with respect to time (see, e.g., FIG. 4 and the manifold 401, the scroll 422-1 and the scroll 422-2 as in a twin-scroll or dual-scroll arrangement where exhaust can flow from the manifold 401 to the scrolls 422-1 and 422-2).

FIG. 6 further shows various examples of force as may be applied force via the wastegate plug 656 to the wastegate seat 626 and a reaction force of the wastegate seat 626. As described by the third of Newton's laws of motion of classical mechanics, forces can occur in pairs such that if one object exerts a force on another object, then the second object exerts an equal and opposite reaction force on the first. As an example, an actuator can apply a force to a shaft of a wastegate, which can be rotational, whereby a plug coupled to the wastegate can apply at least a portion of that force to a wastegate seat. In such an example, the applied force can be greater than a pressure differential between a passage ($P_1$ or $P_2$) or passages ($P_1$ and $P_2$) and a chamber (e.g., $P_c$).

Various features of the assembly 600 may be understood with respect to FIG. 5. For example, the wastegate seat 626 and the divider wall 619 can be defined as in FIG. 5 with respect to the wastegate seat 526 and the divider wall 519. As mentioned, FIG. 6 shows a cone angle $\phi_c$ for the wastegate seat 626, which may be measured with respect to the axis $z_{ws}$ (see, e.g., line parallel to $z_{ws}$). A wastegate seat that includes a conical profile that is defined by a cone angle can seat a plug with a profile that can be curved. For example, the plug 656 includes a profile that is curved. In such an approach, a contact perimeter may be formed such as, for example, a contact perimeter zc as shown in FIG. 5. Where such contact exists, exhaust is substantially blocked from flowing from the passages 623-1 and 623-2 to the exhaust chamber 630. However, as exhaust pressure in the passages 623-1 and 623-2 varies with respect to time in a manner where exhaust pressure in one of the passages is greater than exhaust pressure in the other of the passages, exhaust can flow from one passage to the other via the gap, which can be defined approximately by dimensions Δzg, Δxm and Δym. Accordingly, a volume exists for interpassage flow of exhaust as driven by pulsations that can originate with motion of pistons in cylinders of an internal combustion engine (e.g., via exhaust strokes that driver exhaust to passages of a turbine housing). Depending on various sizes of components, the gap dimension Δzg may be in a range from approximately 0.01 mm to approximately 1 mm and, for example, the dimension Δxm may be of the order of several millimeters or more (e.g., 2 mm to 10 mm).

As mentioned, in the example of FIG. 6, in the closed state, an axial gap exists between the divider wall surface 617 and a lower surface 657 of the plug 656, which is shown as Δzg as it is along the axis $z_{ws}$ as shown in FIG. 5 and FIG. 6. As shown, the divider wall surface 617 may be defined by a width Δxm (see also, e.g., Δxm in FIG. 5). In such a configuration, exhaust in the passage 623-1 may flow through the gap to the passage 623-2 and/or exhaust in the passage 623-2 may flow through the gap to the passage 623-1. Such flow can be referred to as leakage, which may be referred to as scroll-to-scroll leakage. Such leakage differs from leakage from one of the passages 623-1 or 623-2 to the chamber 630. Scroll-to-scroll leakage can act to reduce energy in a scroll. For example, if a scroll was sealed without a scroll-to-scroll leakage path, energy in that scroll would be better maintained (e.g., on its way to a volute and turbine wheel of a turbine assembly of an exhaust gas turbocharger).

Figure 19:
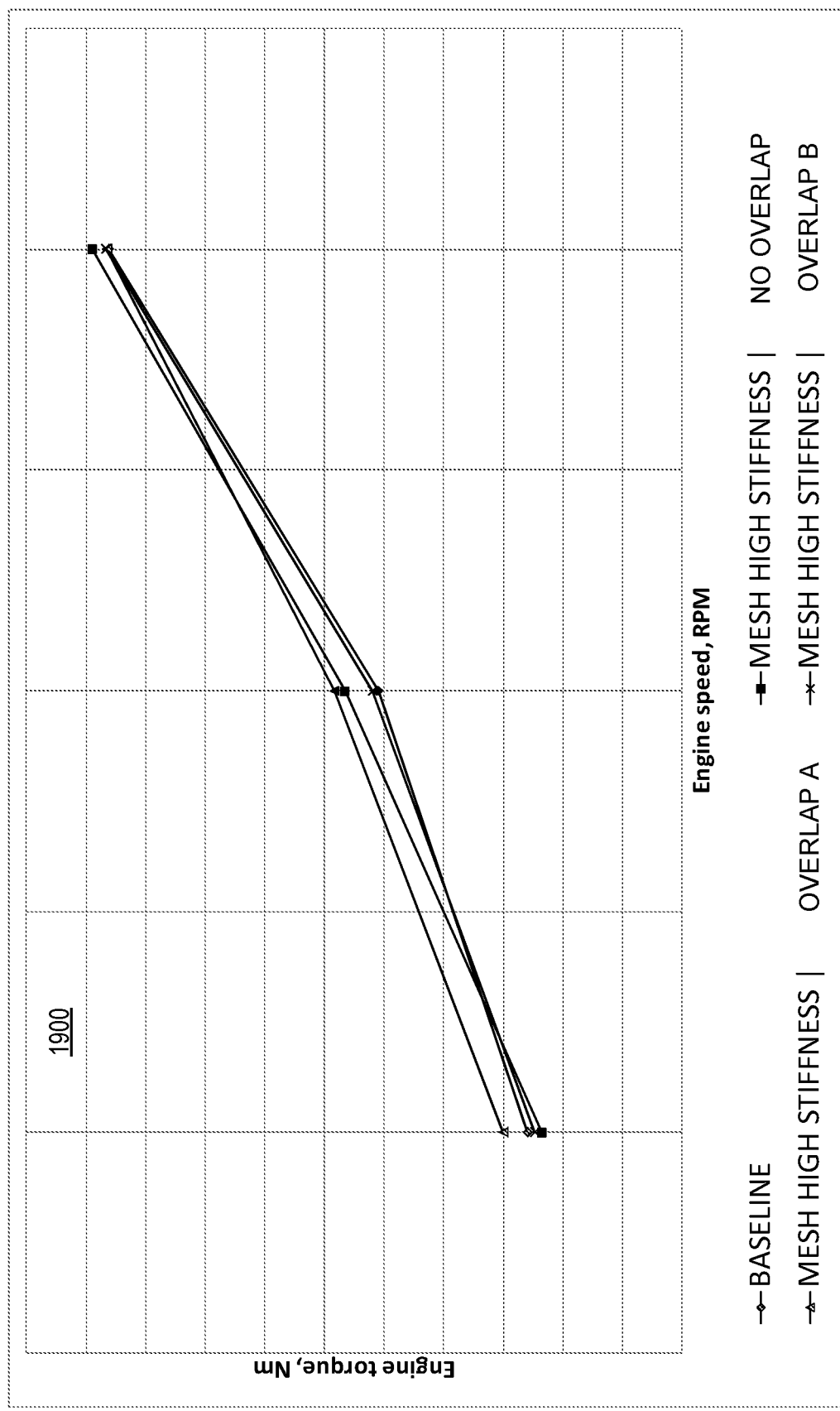
FIG. 19 is an example of a plot that shows data as to an increase in torque for a plug that includes a mesh disposed in a recess of the plug that can hinder flow with respect to a divider wall.

Trials demonstrate that engine torque can be affected by scroll-to-scroll leakage. For example, engine torque can be diminished due to scroll-to-scroll leakage. As an example, a turbine wastegate can include features to effectuate a reduction in scroll-to-scroll leakage, which can result in increased torque (e.g., consider an increase in engine rpm of 30 rpm with an increase in engine torque of 10 Nm). FIG. 19 shows an example plot 1900 of engine torque versus engine speed where, for various trials, a mesh is utilized to reduce scroll-to-scroll leakage in a gap between a divider wall and a plug of a turbine wastegate. Data in the plot 1900 show how the mesh can increase torque by reducing flow of exhaust across the gap. As an example, a mesh can be configured to withstand temperatures of 1080 degrees C. Such a mesh may be made of a material that includes metal (e.g., a metal mesh).

Modern gasoline turbocharger benefit from precise turbocharger control to meet regulation standards. A turbocharger that provides sealing between scrolls can improve turbocharger performance and control, as sealing can reduce the effect of pulsations that may lead to scroll-to-scroll leakage and as such sealing can also increase efficiency of a turbocharger.

As an example, a seal may be or include a wire mesh, which may be made of a suitable material such as, for example, a stainless steel material that can operate up to maximum exhaust gas temperatures (e.g., up to 1080 degrees C. peak or optionally more). Such a material can be a kinematic material in that it changes shape during operation in response to force. For example, a mesh can have a free-standing shape and a compressed shape (e.g., a loaded shape). As an example, a mesh can transition from a free-standing shape to a compressed shape as a wastegate is transitioned from an open state to a closed state. In the closed state, the compressed shape can be due to compression of the mesh between a plug of the wastegate and a divider wall surface of a turbine housing.

As an example, a mesh may be attached to a plug via one or more techniques. As an example, a plug may be manufactured to include a recess (e.g., a cavity) for attachment of a mesh. As an example, a mesh may be partially fit into a recess and retained by the recess where a portion of the mesh is external to the recess and available for contact and compression with respect to a divider wall surface of a turbine housing. As an example, an attachment mechanism may be via a weld or welds (e.g., consider laser welding, etc.). As an example, an attachment mechanism may be via melting and hardening of a material. For example, consider positioning a portion of a mesh in a recess of a plug where molten material can harden in the recess to cause the mesh to be attached to the plug. Such a material may, upon hardening, be capable of withstanding operational temperatures of an exhaust turbine assembly.

As an example, a stiffness of a mesh may be selected in a manner that accounts for actuator force required to maintain a wastegate in a closed state. For example, a stiff mesh may add to force required to maintain a plug in a closed state; while a less stiff mesh may add less to the force. As an example, an actuator may be rated as to force it can apply to a plug in a closed state. In such an example, a mesh may be selected that adds a minimal amount of force such that an assembly is within an operating range of force of an actuator (e.g., redesign of an actuator not being required to implement a mesh).

As an example, a mesh may be configured with an amount of overlap with respect to a divider wall surface. As an example, a mesh may provide an increase in torque, a reduction in transient response (e.g., of the order of hundreds of milliseconds) and may be durable with respect to operational conditions. As to overlap, a range of 0.01 mm to approximately 0.5 mm may be utilized (e.g., or optionally more such as approximately 1 mm to 3 mm). As an example, an amount of overlap may be selected as being dependent on stiffness of a mesh where a stiffer mesh may have less overlap than a softer mesh. As an example, an amount of overlap may be selected based on trials such as, for example, trials corresponding to data as in the plot 1900 of FIG. 19.

As an example, a wire mesh can be made of an alloy. As an example, an alloy for a mesh can be a cobalt base alloy or nickel base alloy. Some examples include L605 (cobalt alloy, also e.g., HAYNES® 25); 694 (e.g., CM-64), WASPALOY® (nickel alloy); TRIBALOY® T-800 (cobalt-chromium-molybdenum alloy); Rene 41 (hardened nickel alloy); C263 (aluminum-titanium age hardened nickel base superalloy); 188 (cobalt base alloy); INCONEL® (austenitic nickel-chromium-based superalloys); etc. As an example, an INCONEL® 600, 601, 617, 625, 690, 718 or X-750 may be utilized, which include nickel in a range as percent by mass of approximately 44 to approximately 72 or more and chromium in a range as percent by mass of approximately 14 to approximately 30.

As an example, a wire mesh may be formed from wire that is shaped to achieve desired properties. For example, wire may be formed via compressing into a mesh where the mesh can be defined by a total volume and a porosity (e.g., fractional void volume of the mesh). As an example, a wire mesh can include a weave (e.g., knitting, etc.). As an example, a mesh may be shaped via cutting from stock mesh (e.g., via stamping, etc.). As an example, a mesh can be a compressible mesh with a free standing porosity, an installed porosity, etc., that can be compressed against a divider wall to reduce its porosity (e.g., a closed state porosity).

As an example, a mesh can be resilient and deform elastically or at least in part elastically such that it changes shape upon application of force and changes shape upon release of at least a portion of such force. As an example, a mesh may deform to a limited extent plastically where, for example, a mesh in a plastic deformation range will first have undergone some amount of elastic deformation, which is reversible, so the mesh will return at least in part to a previous shape. As an example, an assembly may be configured such that a mesh is to deform substantially elastically during operation, for example, being subject to force in a closed state of a plug and being released of such force in an open state of the plug. As an example, a mesh attached to a plug may experience some amount of plastic deformation while still being able to reduce leakage between a plug and a divider wall.

As an example, a mesh may be made from a material such as INCONEL® alloy. For example, consider INCONEL® 601 (W.Nr. 2.4851) alloy with a wire diameter of approximately 0.112 mm. As an example, a mesh can be a wire mesh with a wire diameter selected to be in a range from approximately 0.03 mm to approximately 0.3 mm. As an example, a mesh may be a wire mesh with a wire diameter of approximately 0.1 mm (e.g., 0.1 mm+/−25 percent). As an example, a mesh may be a wire mesh with a wire diameter of approximately 0.15 mm (e.g., 0.15+/−25 percent). As an example, a mesh may be a wire mesh with a maximum cross-sectional dimension that is less than approximately 0.5 mm or less than approximately 0.25 mm. As an example, a mesh can be selected (e.g., configured) such that breakage of the mesh that may release mesh particles, short pieces of mesh wire, etc., releases material that is sufficiently small to reduce impact to a turbine wheel of a turbine assembly. For example, where a wire mesh with a wire diameter of approximately 0.25 mm or less has a short portion of wire (e.g., a few millimeters or less) break off, that short portion may pass by a turbine wheel in a turbine wheel space of a turbine housing without substantial risk of damaging the turbine wheel. In such an example, a wire mesh can allow for reduce risk of damage to a turbine wheel (e.g., due to breakage and debris being of a small size, low mass, etc.). In the instance that a substantial portion of a mesh breaks, the risk of catastrophic damage to a turbine wheel may be reduced as the mesh can be resilient. In such an example, the portion of the mesh may pass a turbine wheel without substantial damage to the turbine wheel and may pass into an exhaust system, similarly, without substantial risk to a catalytic converter, the environment, etc.

As an example, a mesh can be formed of an alloy that includes nickel and chromium. As an example, a mesh may be formed of an austenitic nickel-chromium-based superalloy. As an example, one or more types of INCONEL® alloy may be utilized. As an example, an INCONEL® 601 alloy may be utilized or a higher grade of INCONEL® alloy. Table 1 below lists various percentages for INCONEL® 601 alloy:

TABLE 1

| INCONEL ® 601 Alloy. | |
|---|---|
| Nickel | 58.0-63.0 |
| Chromium | 21.0-25.0 |
| Iron | Remainder |
| Aluminum | 1.0-1.7 |
| Carbon | 0.10 max. |
| Manganese | 1.0 max. |
| Sulfur | 0.015 max. |
| Silicon | 0.50 max. |
| Copper | 1.0 max. |

Table 2 below lists various percentages for INCONEL® 718 alloy:

TABLE 2

| INCONEL ® 718 Alloy. | |
|---|---|
| Nickel (plus Cobalt) | 50.00-55.00 |
| Chromium | 17.00-21.00 |
| Iron | Balance* |
| Niobium (plus Tantalum) | 4.75-5.50 |
| Molybdenum | 2.80-3.30 |
| Titanium | 0.65-1.15 |
| Aluminum | 0.20-0.80 |
| Cobalt | 1.00 max. |
| Carbon | 0.08 max. |
| Manganese | 0.35 max. |
| Silicon | 0.35 max. |
| Phosphorus | 0.015 max. |
| Sulfur | 0.015 max. |
| Boron | 0.006 max. |
| Copper | 0.30 max. |

As an example, a mesh may provide for side overlap with a divider wall surface of approximately 1.5 mm. As an example, a mesh may be defined by height, width and length, which may define a mesh volume in a free-standing state. As an example, a mesh may be approximately 2 mm in height, approximately 5 mm in width and approximately 26 mm in length in a free-standing state. As an example, a mesh can be wider than it is high and longer than it is wide.

As an example, a mesh may be retained in a recess of a plug via an expansion force exerted by the mesh against surfaces that define the recess of the plug. As an example, a free-standing volume of a mesh can be greater than an installed volume of a mesh where the mesh is fit to a plug by at least a portion of the mesh being disposed in a recess of the plug. As an example, a mesh can have a waist or pinched section when fit to a plug. In such an example, a recess can include an opening to an interior cavity where a dimension of the interior cavity can be greater than a dimension of the opening such that the opening acts to compress the mesh (e.g., pinch the mesh to form a waist). In such an example, removal of the mesh from the recess can involve compressing the mesh as it is squeezed through the opening.

As an example, a mesh may be secured to a plug via a force exerted by the mesh. Such force may be an outward force that causes the mesh to contact and apply force to surfaces that define a recess of a plug. As mentioned, one or more other mechanisms may be utilized to attach a mesh to a plug (e.g., welding, molten material that hardens, etc.).

Figure 7:
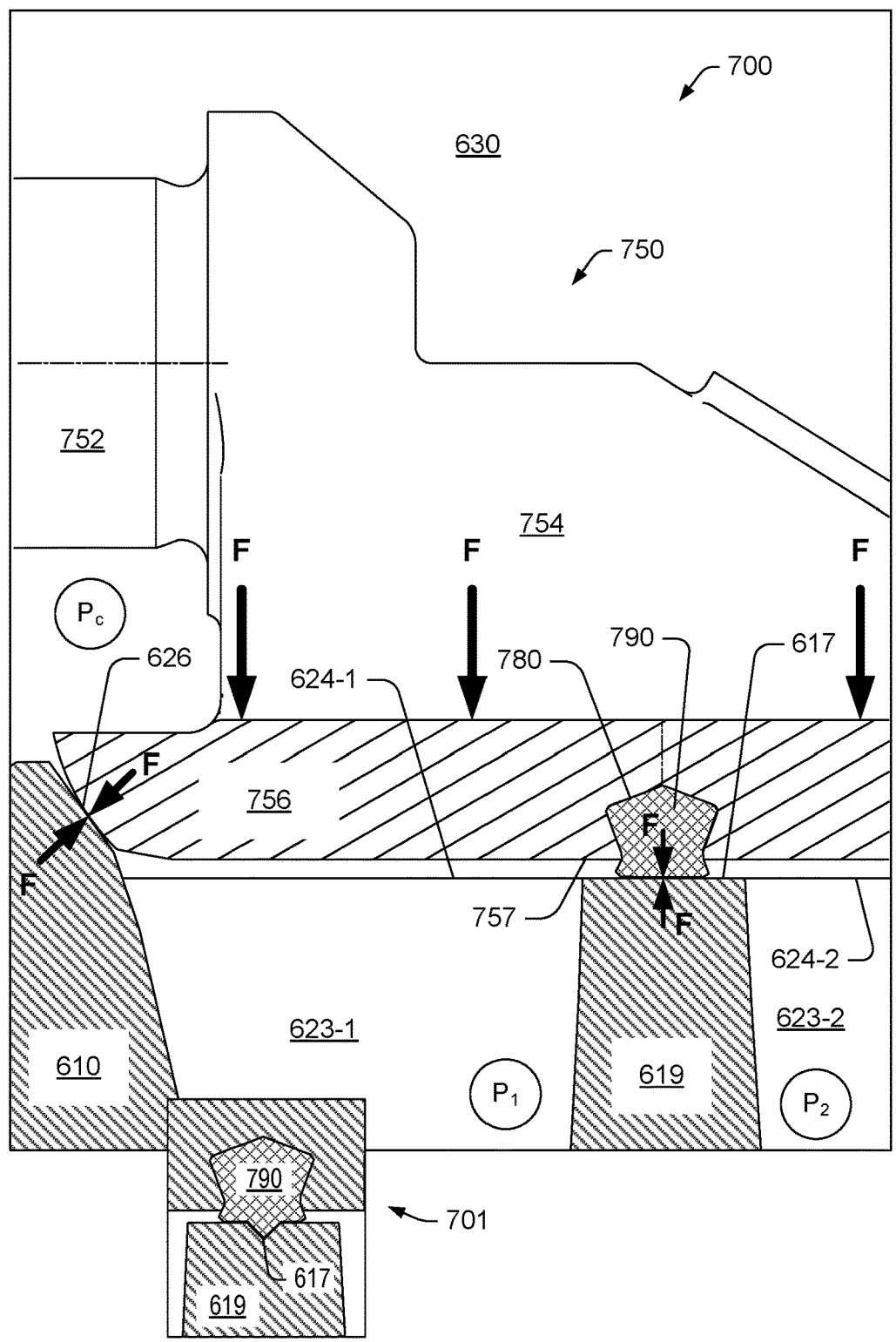
FIG. 7 is a cross-sectional view of a portion of an example of an assembly that includes a mesh that fills a gap between a divider wall and a plug.

FIG. 7 shows an example of a portion of an assembly 700 that includes various features of the assembly 600 with the exception that the wastegate 650 is replaced with an example wastegate 750. Various dimensions shown in FIG. 7 may be understood with respect to dimensions shown, for example, in FIG. 5 and/or FIG. 6. Further, various pressures and forces may be understood with respect to, for example, FIG. 6. Additionally, FIG. 7 shows forces associated with a mechanism that can reduce flow of exhaust from one passage to another passage, which may be referred to as scroll-to-scroll leakage.

As shown in FIG. 7, the wastegate 750 includes a shaft 752, an arm 754, and a plug 756 with a lower surface 757 where the plug 756 includes a recess 780 in the lower surface 757 that provides for attachment of a mesh 790. In the example of FIG. 7, the mesh 790 is in contact with the divider wall surface 617 such that the mesh 790 hinders flow of exhaust across the gap. As shown in FIG. 7, the contact can be with an amount of force, which with respect to the mesh 790, may be sufficient to cause some amount of compression of at least a portion of the mesh 790 (e.g., to be in a compressed state).

In a compressed state, the mesh 790 can have decreased internal void spaces (e.g., decreased porosity) compared to an uncompressed state (e.g., free-standing state). As such, force can compress the mesh 790 and thereby increase the ability of the mesh 790 to hinder flow to increase sealing across the gap. For example, at least a portion of the mesh 790 can be denser with lesser porosity in the closed state of the plug 756 with respect to the wastegate seat 626 than for the open state of the plug 756 with respect to the wastegate seat 626.

As an example, the assembly 700 can include the turbine housing 610 that includes a bore, the wastegate seat 626, wastegate passages 623-1 and 623-2 that extend to the wastegate seat 626 and a divider wall 619 disposed between the wastegate passages 623-1 and 623-2 where the divider wall 619 includes a divider wall surface 617; a rotatable wastegate shaft 752 configured for receipt by the bore; a wastegate arm 754 extending from the wastegate shaft 753; and a wastegate plug 756 extending from the wastegate arm 754 where the wastegate plug 756 includes a contact portion that contacts the wastegate seat 626 to cover the wastegate passages 623-1 and 623-2 in a closed state and a mesh 790 that contacts the divider wall surface 617 in the closed state. As show in the example of FIG. 7, the mesh 790 can include a portion that is disposed in the recess 780 of the wastegate plug 756 and another portion that is exposed for contacting the divider wall surface 617. In such an example, the mesh 790 can reduce flow of exhaust from one of the wastegate passages 623-1 and 623-2 to another one of the wastegate passages 623-1 and 623-2. In such an example, the reduction in flow of exhaust between the wastegate passages 623-1 and 623-2 (e.g., via the mesh being disposed in part in a gap) can provide for an increase in torque of an internal combustion engine that includes a turbocharger that includes the assembly 700 (see, e.g., the plot 1900 of FIG. 19).

As an example, during operation of a turbine wastegate, a mesh may contact a divider wall before a plug of the turbine wastegate contacts a wastegate seat. For example, in FIG. 7, contact may be made between the mesh 790 and the divider wall 619 prior to contact between the plug 756 at a perimeter contact portion and a contact portion of the wastegate seat 626.

As an example, a mesh may act to reduce force via compression in a manner that acts to reduce force at time of contact of a plug and a wastegate seat. For example, where the plug 756 is being controlled to transition from an open orientation (e.g., open state) to a closed orientation (e.g., a closed state), the mesh 790 may absorb some amount of energy such that acceleration of the plug 756 toward the wastegate seat 626 is decreased, which, in turn, can decrease noise and/or wear of the plug 756 and/or the wastegate seat 626. In such an example, the mesh 790 can be a damper mesh that damps noise as may be associated with fast movement of the plug 756 stopping upon contact with the wastegate seat 626. For example, the damper mesh can slow movement of the plug 756 just before contact with the wastegate seat 626. Once in contact, the force applied to the plug 756 to maintain it in a closed orientation (e.g., closed state) can be approximately the same as without the damper mesh. In such an approach, the damper mesh can reduce noise and/or wear without introducing a burden on the actuator or other closure mechanism that would require oversizing of the actuator or other closure mechanism. For example, a damper mesh may add an amount of spring like force that is selected to be within a pre-existing operational safety margin for sizing of an actuator or other closure mechanism such that a plug with a damper mesh can be implemented without changing the actuator or other closure mechanism of a turbocharger. As an example, a spring like force of a mesh can be selected to be a fraction of a total closure force that aims to maintain a plug in a closed orientation (e.g., closed state) with respect to a wastegate seat (e.g., consider a force that is less than approximately 10% of the total closure force).

Referring again to FIG. 5, as an example, the divider wall surface 517 may be smooth and/or textured. As an example, the divider wall surface 517 may include a recess that can receive a portion of a mesh. For example, with reference to an example assembly 701 of FIG. 7, consider the divider wall surface 617 as including a recess that has an opening that is of a lesser width than the opening of the recess 780 such that a portion of the mesh 790 can be received in the recess of the divider wall surface 617 to create a more tortuous flow path as sides of the mesh 790 may contact sides of the recess.

In the example of FIG. 7, the assembly 701 includes a recess that can be shaped as a groove in the divider wall surface 617 that includes a triangular cross-sectional profile. Such an approach can provide for application of less stress to a portion of the mesh 790, which may, exhibit lesser wear of the mesh 790 over time (e.g., operational time of a turbocharger). In such an example, where wear or other type of misalignment may occur for the plug 756 with respect to the wastegate seat 626, a portion of the mesh 790 may be "fresher" as it has been less compressed due to the recess of the divider wall surface 617. In such an approach, the mesh 790 may, overall, exhibit a longer operational lifetime and may be more adaptable to changes that may occur with respect to various components of a turbocharger over time. As an example, where a small shift to the left or right occurs with respect to the groove of the divider wall surface 617, the portion of the mesh 790 that previously aligned with the groove may now align with a flatter portion (e.g., a planar portion) of the divider wall surface 617 where it now experiences compression not previously experienced. As such that portion of the mesh 790 may have experienced lesser compression (e.g., cycle compression) and thus have more longevity than adjacent portion(s) of the mesh 790 that may have experienced greater compression (e.g., cycle compression). Where a recess in a divider wall surface is utilized, the turbine housing may be suitable for use with a plug that includes a mesh or does not include a mesh.

As an example, a divider wall can be without a recess or with one or more recesses. As an example, a plug can include one or more meshes received at least in part in one or more recesses.

Figure 8:
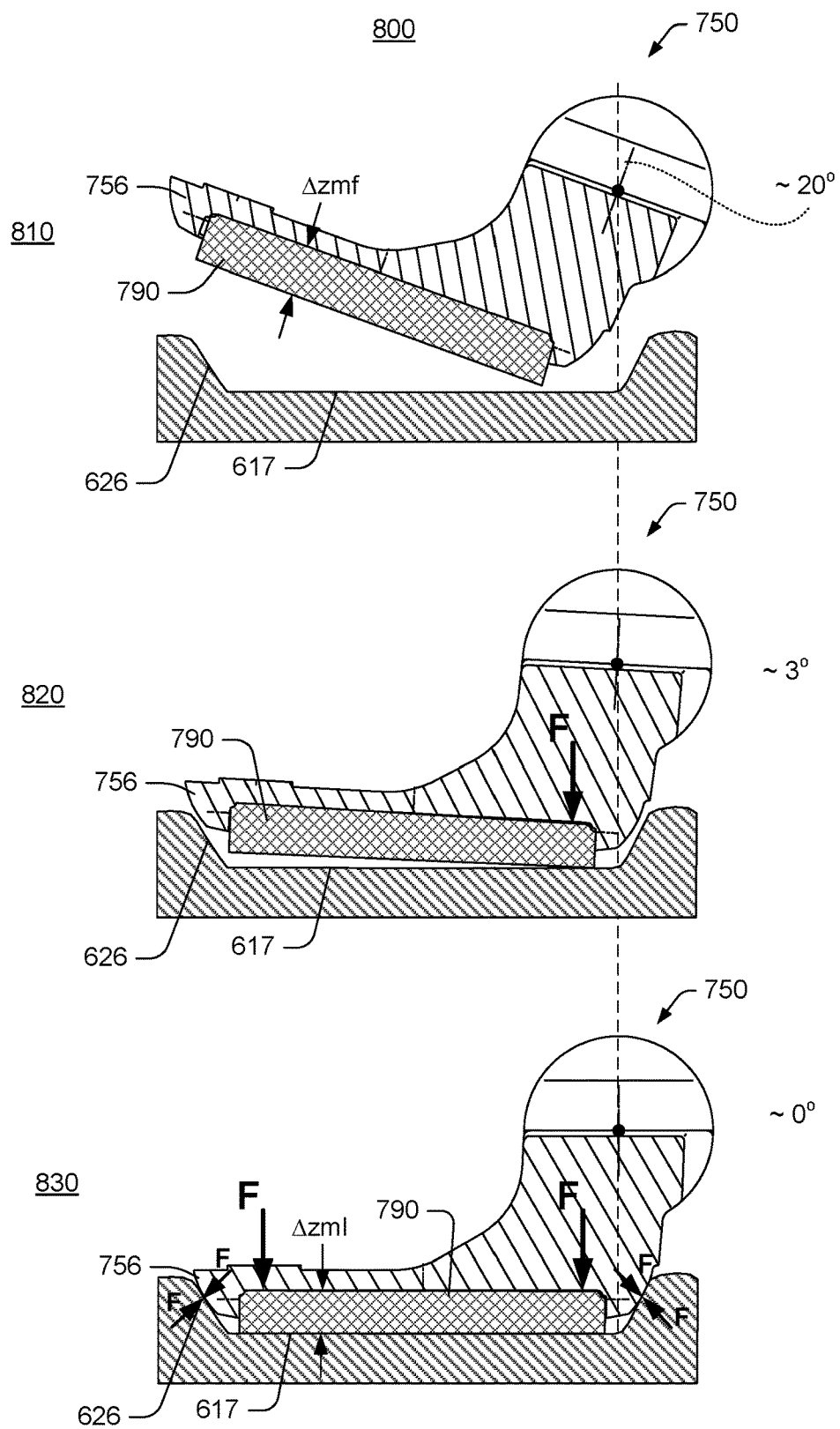
FIG. 8 is a series of views of an example of a method.

FIG. 8 shows an example of a method 800 that includes rotating 810 the wastegate 750 to a closed position with respect to the wastegate seat 626 where an exposed portion of the mesh 790 that extends away from the lower surface 757 of the plug 756 is in a free-standing state, contacting 820 a portion of the mesh 790 and a portion of the divider wall surface 617, and closing 830 the wastegate 750 such that the exposed portion of the mesh 790 is in a compressed state and in contact with the divider wall surface 617. As shown, the contacting 820 occurs at an angle of rotation about the shaft axis of the wastegate 750 of less than approximately 10 degrees (e.g., optionally less than approximately 5 degrees) where approximately 0 degrees corresponds to a closed state (e.g., the lower surface 757 of the plug 756 being substantially parallel to the divider wall surface 617). In FIG. 8, the size of the force arrows does not represent magnitude but rather approximate direction; noting that force arrows are shown at the periphery of the plug 756 of the wastegate 750 with respect to the wastegate seat 626.

In the example of FIG. 8, the mesh 790 is shown in a cross-sectional view where a mesh height $\Delta z$ can be a free-standing height $\Delta z_{mf}$ or a compressed height (e.g., a loaded height) $\Delta z_{ml}$ in the closed state of the wastegate 750. As shown, the mesh deforms, which can be elastic deformation. As an example, a mesh may be subjected to plastic deformation. For example, consider installing a mesh in a free-standing state as to a portion of the mesh that extends outwardly from a surface of a plug of a wastegate and then compressing that portion of the mesh against a divider wall surface during operation of the wastegate where the mesh does not fully return to its free-standing state. As an example, a mesh may exhibit some amount of elasticity.

As explained with respect to FIG. 12B, further below, the mesh 790 may be inclined by, for example, being set in an inclined recess. Or, for example, the mesh 790 may be cut at an incline. In such examples, the force shown in the contacting 820 may be reduced such that resistance to closing may be reduced at the corresponding angle at which contact occurs or such that contact occurs at a smaller angle while still providing for filling of a gap with the mesh.

Figure 9:
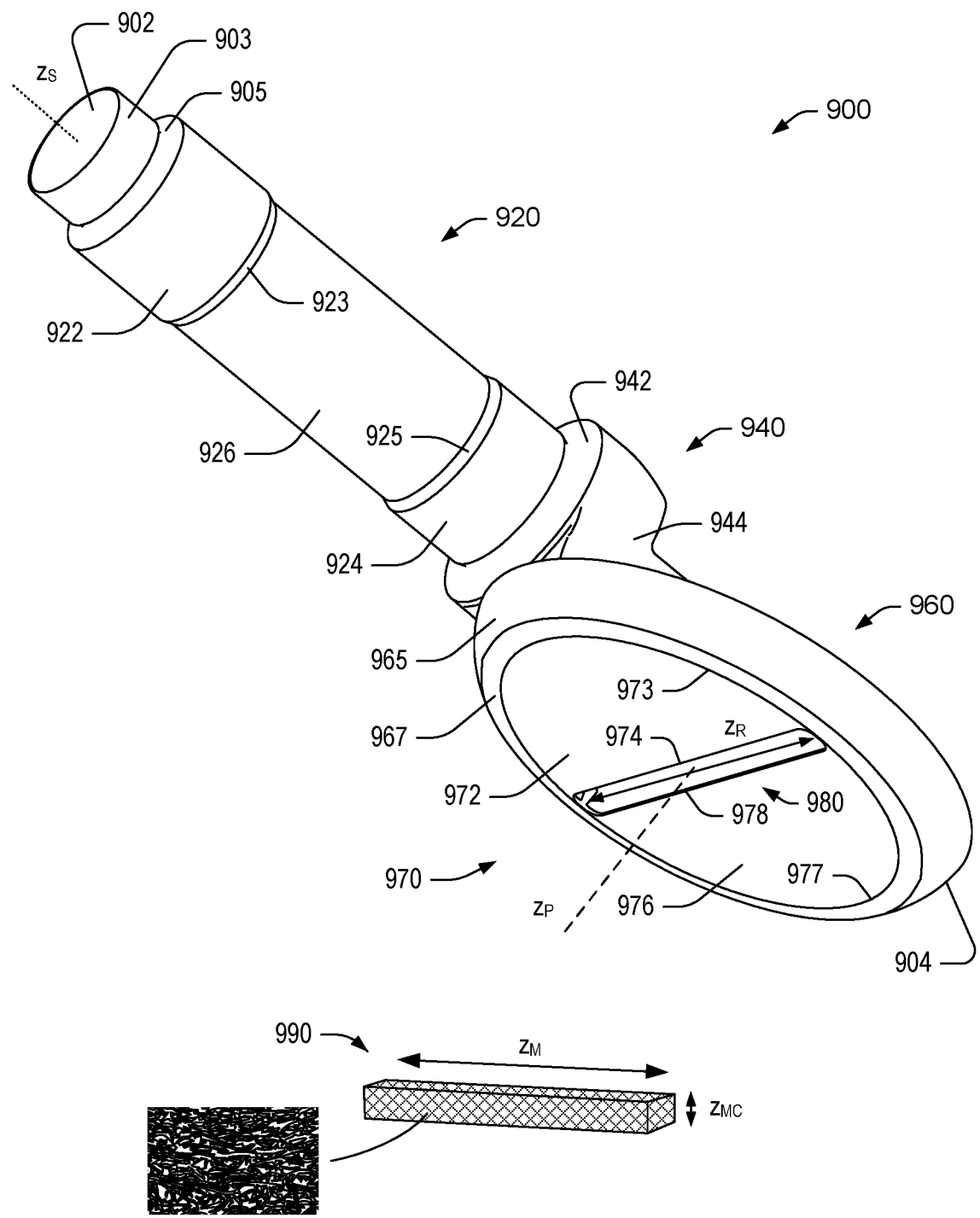
FIG. 9 is a perspective view of an example of a wastegate.

FIG. 9 shows an example of a wastegate 900 that includes a shaft 920, an arm 940 and a plug 960. FIG. 9 also shows an example of a mesh 990, which may be combined with the wastegate 900 to form an assembly. An approximate enlarged view of a portion of the example of the mesh 990 shows how wire may be configured to form the mesh 990. The wastegate 900 can be a flapper valve where the plug 960 is a flap that covers exhaust passages in a closed state. The wastegate 900 can be transitioned from an open state to a closed state and from a closed state to an open state via rotation of the shaft 920 about a rotational axis $z_S$ of the shaft 920. The wastegate 900 can be in a substantially L-shape or hockey stick shape where a long portion corresponds to the shaft 920 and a shorter portion corresponds to the arm 940 and the plug 960. The plug 960 may be considered to be a functional portion of the wastegate 900 in that it can be positioned to regulate flow of exhaust from passages to a chamber (e.g., as in a wastegating function). In such an approach, when the plug 960 is in an open state, exhaust can flow from the passages to a chamber, which can be in fluid communication with an exhaust system of a vehicle such that the wastegated amount of exhaust can flow via the exhaust system to the environment.

The shaft 920 can be defined in part by a longitudinal axis as an axis of rotation, shown as $z_S$, and the plug 960 can be defined in part by an axis that is normal to a plane defined by the plug 960, shown as $z_P$. In a closed state, the axis of the plug 960 $z_P$ may be aligned with an axis of a wastegate seat (see, e.g., $z_{WS}$ in FIG. 5), which may be, for example, an axis of a cone where the wastegate seat is defined by a conical section (see, e.g., cone angle $\phi_c$).

As shown in the example of FIG. 9, the wastegate 900 includes opposing ends 902 and 904 that can define an overall length of the wastegate 900 where the end 902 is defined by the shaft 920 and where the end 904 is defined by the plug 960. As to the shaft 920, it can include a portion 903 for attachment of a control arm, a shoulder 905 that steps radially to a journal surface 922, a shoulder 923 that steps radially to a surface 926, and a shoulder 925 that steps radially to another journal surface 924. The journal surfaces 922 and 924 may be in contact with an inner surface of a bushing that is disposed in a bore of a turbine housing. As an example, a mechanical linkage can be coupled to the shaft 920 at the portion 903 (e.g., via a control arm) such that the shaft 920 is rotatable in a bore of a turbine housing where such rotation is substantially along the axis $z_S$ of the shaft 920. In such an approach, the plug 960 rotates with the shaft 920 to either bring the plug 960 closer to or further from a wastegate seat (see, e.g., the wastegate seat 526 of FIG. 5).

As shown in the example of FIG. 9, the arm 940 includes a shoulder 942 that steps radially to the shaft 920 and another portion 944 that extends to the plug 960. As shown in the example of FIG. 9, the plug 960 can include a contact surface 965 that may be shaped as a portion of a torus where the contact surface can be defined by an axial height and a radius of the torus. As shown, the contact surface 965 extends to an annular surface 967 that surrounds a portion 970 of the plug 960.

In the example of FIG. 9, the portion 970 of the plug 960 includes a surface 972 defined by borders 973 and 974 and a surface 976 define by borders 977 and 978. As shown, the borders 973 and 977 can be borders with the annular surface 967, which may be a planar annular surface. As shown, the surfaces 972 and 976 can be substantially planar and separated by a recess 980, which can be defined at least in part by the borders 974 and 978. In such an example, the recess 980 can be utilized to secure a mesh such as the mesh 990 to the wastegate 900 where the mesh extends at least in part outwardly from the surfaces 972 and 976 to contact a divider wall surface (see, e.g., the divider wall surface 517 of FIG. 5). In such an example, the surface 972 may be positioned over a first exhaust passage with a corresponding opening and the surface 976 may be positioned over a second exhaust passage with a corresponding opening where the two passages are separated by a divider wall with a divider wall surface where, in a closed state of the wastegate 900, the recess 980 is positioned substantially over the divider wall surface. Such an arrangement of features can be understood, for example, with respect to the example of FIG. 5.

In FIG. 9, the recess 980 is shown as being characterized in part by a dimension $z_R$, which may be substantially the same as an inner diameter of the annular surface 967. In such an arrangement, a border exists between the recess 980 and the contact surface 965 of the plug 960. Such an arrangement of features can provide a safety margin that aims to isolate a mesh to an extent that it does not interfere with contact between the contact surface 965 and a wastegate seat; rather, the mesh is isolated for contact with a divider wall surface that separates two exhaust passages (see, e.g., the divider wall surface 517 and the wastegate seat 526 in FIG. 5).

As shown in FIG. 9, the mesh 990 can be defined in part by a mesh dimension $z_M$ and can be defined in part by a compressible mesh dimension $z_{MC}$. As to the example shown in FIG. 9, the mesh 990 may be in a compressed state or an uncompressed state. Once insertably fixed in the recess 980 of the plug 960, the mesh 990 can be in at least a partially compressed state such that the mesh 990 applies an outwardly directed force to one or more walls that define the recess 980 to help secure the mesh 990 in the recess 980. For example, the mesh 990 can be a spring mesh such that it is compressed to fit inside the recess 980 and in that it applies an outwardly directed force against one or more walls that define the recess 980 such that it is unlikely that the mesh 990 will readily "fall" out of the recess 980. In such an example, to remove the mesh 990 from the recess 980, force such as a pulling force by mechanical pliers gripping the mesh 990 may be required to extract the mesh 990 from the recess 980. In such an example, the applied force from the gripping of the pliers (e.g., needle nose pliers) may cause portions of the mesh 990 to break off the mesh 990 before the mesh 990 is removed from the recess 980. In other words, the force that retains the mesh 990 in the recess 980 may be greater than the force required to pull fibers off the mesh 990, particularly if the mesh 990 has been utilized in operation and exposed to repeated temperature cycling, etc., from hot exhaust gas. As described, the mesh 990 can be resiliently secured in the recess 980 via its own material properties, particularly its own spring-like properties, which may be approximated via Hooke's equation $F=-k\Delta x$ where k is a property of the mesh 990 and $\Delta x$ is a dimension by which the mesh 990 is compressed in the recess 980 (e.g., orthogonal to the dimension $z_R$).

In the example of FIG. 9, the recess 980 includes a mouth or a neck at its opening that is narrower than an internal dimension of the recess 980. In such an approach, a mesh can be compressed to fit into the open and, in part, pass through the mouth or the neck where the mesh can expand, at least partially. In such an approach, to remove the mesh from the recess 980, the expanded portion would need to be compressed to pass outwardly through the mouth or neck of the recess 980, which would require application of force. Thus, the shape of the recess 980 can be utilized to help secure a mesh in a plug of a wastegate. For example, the recess 980 can include a dimension that is wider inside the plug 960 than at the mouth or neck of the recess 980. Inside the recess 980, a portion of a mesh may be in a free standing state (e.g., full expanded) such that to remove the mesh, the portion must be compressed from the free standing state to fit through a mouth or neck of the recess 980. As mentioned, a portion of the mesh can be in a compressed state inside a recess where, to remove the mesh, that portion requires further compression to fit through a mouth or neck of the recess. In various examples, properties of a mesh can be utilized to help maintain the mesh in a recess of a plug.

Figure 10:
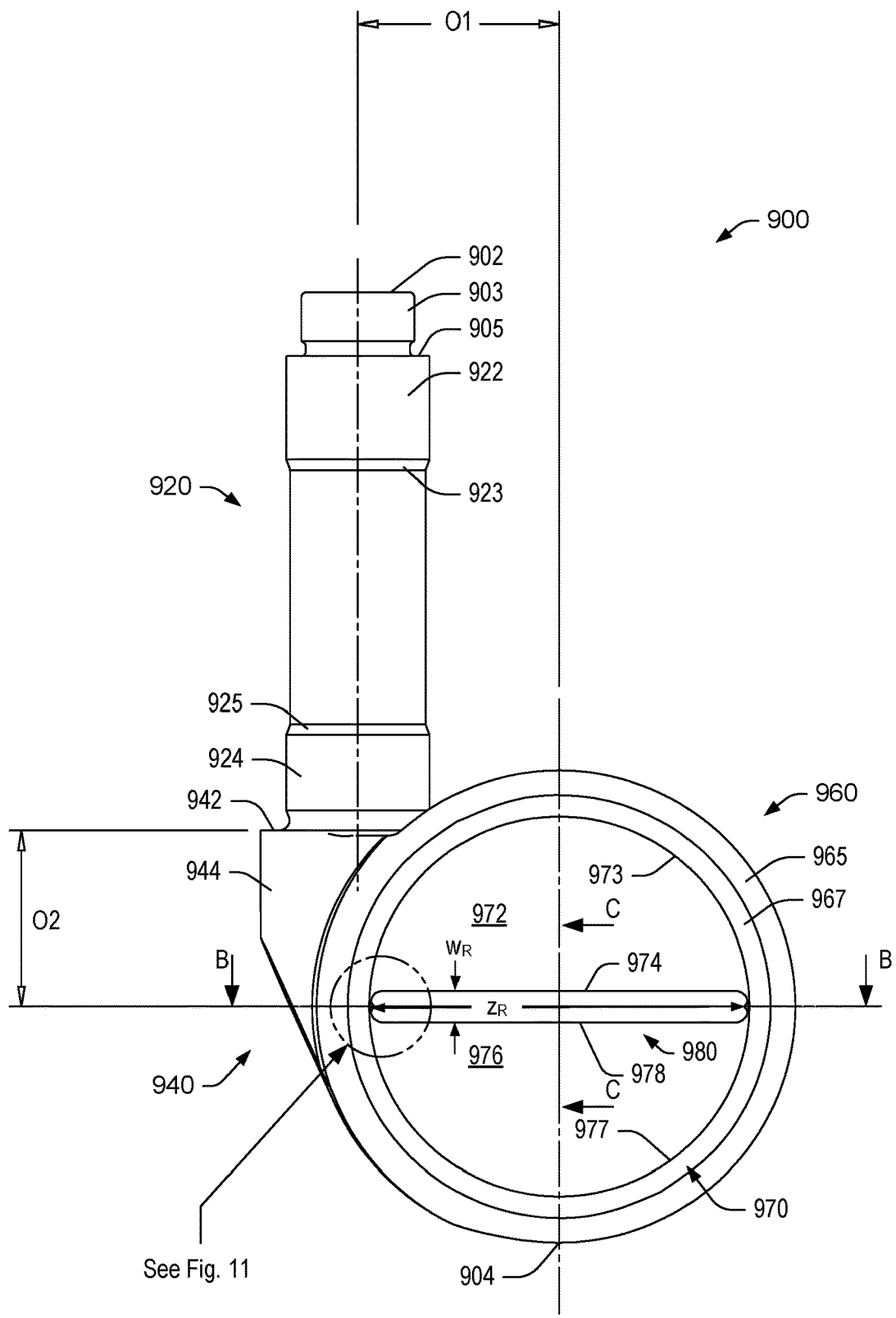
FIG. 10 is a plan view of the wastegate of FIG. 9.

FIG. 10 shows the wastegate 900 of FIG. 9 in a plan view along with various dimensions, including O1, which is an offset between the axis of the shaft 920 and the axis of the plug 960 and O2, which is an offset between an end of the shaft 920 and the axis of the plug 960. In the view of FIG. 10, the plug 960 may be defined in part via an x, y, z Cartesian coordinate system and/or an r, z, Θ cylindrical coordinate system. In such coordinate systems, z can correspond to the axis of the plug 960 (see, e.g., $z_P$ in FIG. 9). As an example, the surfaces 972 and 976 may be defined with respect to a bean curve or a hemi-circle, optionally with an offset such that a dimension "a" is along the border 974 or the border 978.

A bean curve may be defined by a quartic curve given by the implicit equation: $x^4+x^2 y^2+y^4=ax(x^2+y^2)$, which has horizontal tangents at (0.66a, +/−0.66a) and vertical tangents at (0, 0) and (a, 0).

As shown in FIG. 10, the recess 980 can include a length (e.g., $z_R$) and a width (e.g., $w_R$) where the length is greater than the width. In the example of FIG. 10, the length of the recess 980 is less than a diameter of the annular surface 967, which is less than a diameter of the contact surface 965, which may be referred to as a contact portion of the wastegate plug 960.

Figure 11:
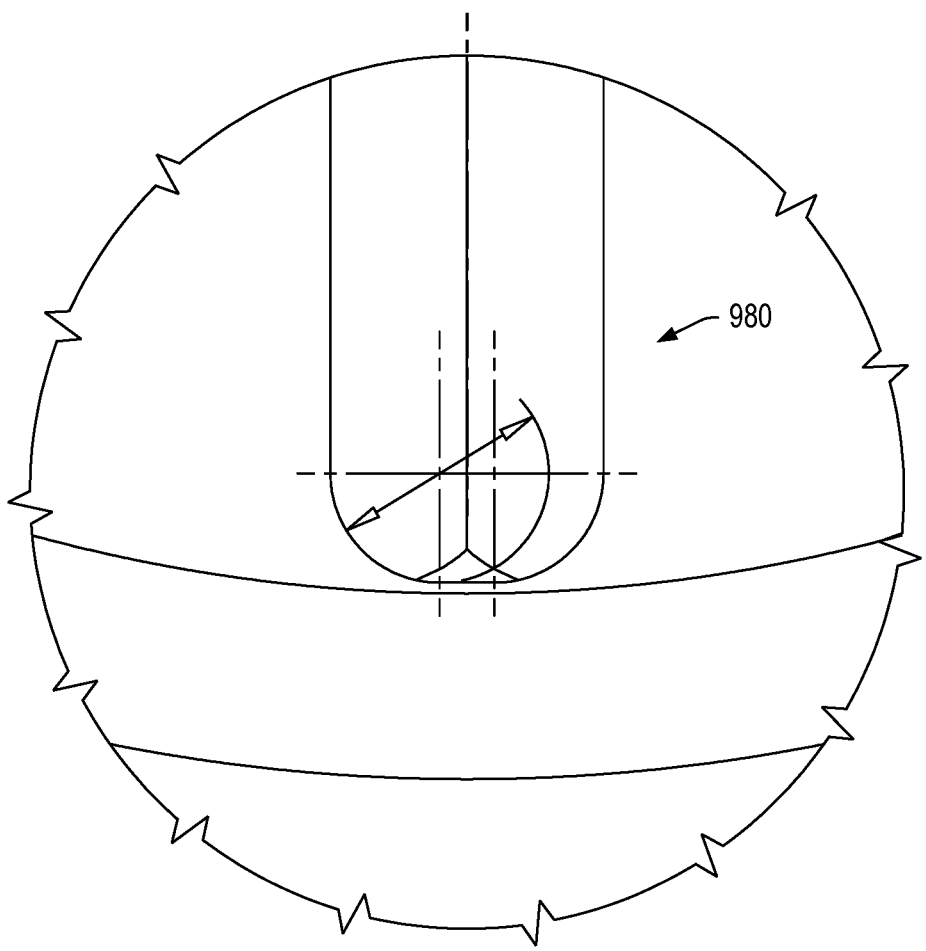
FIG. 11 is a plan view of a portion of the wastegate of FIG. 9.

FIG. 11 shows an enlarged view of a portion of the recess 980, which may be machined using a milling machine, such as a milling cutter with a diameter of approximately 0.5 mm to approximately 5 mm, depending on the size of the recess to be formed, etc. Such a cutter (e.g., a cutting tool) may be employed for multiple cuts at each end to form the recess 980.

Figures 12A, 12B:
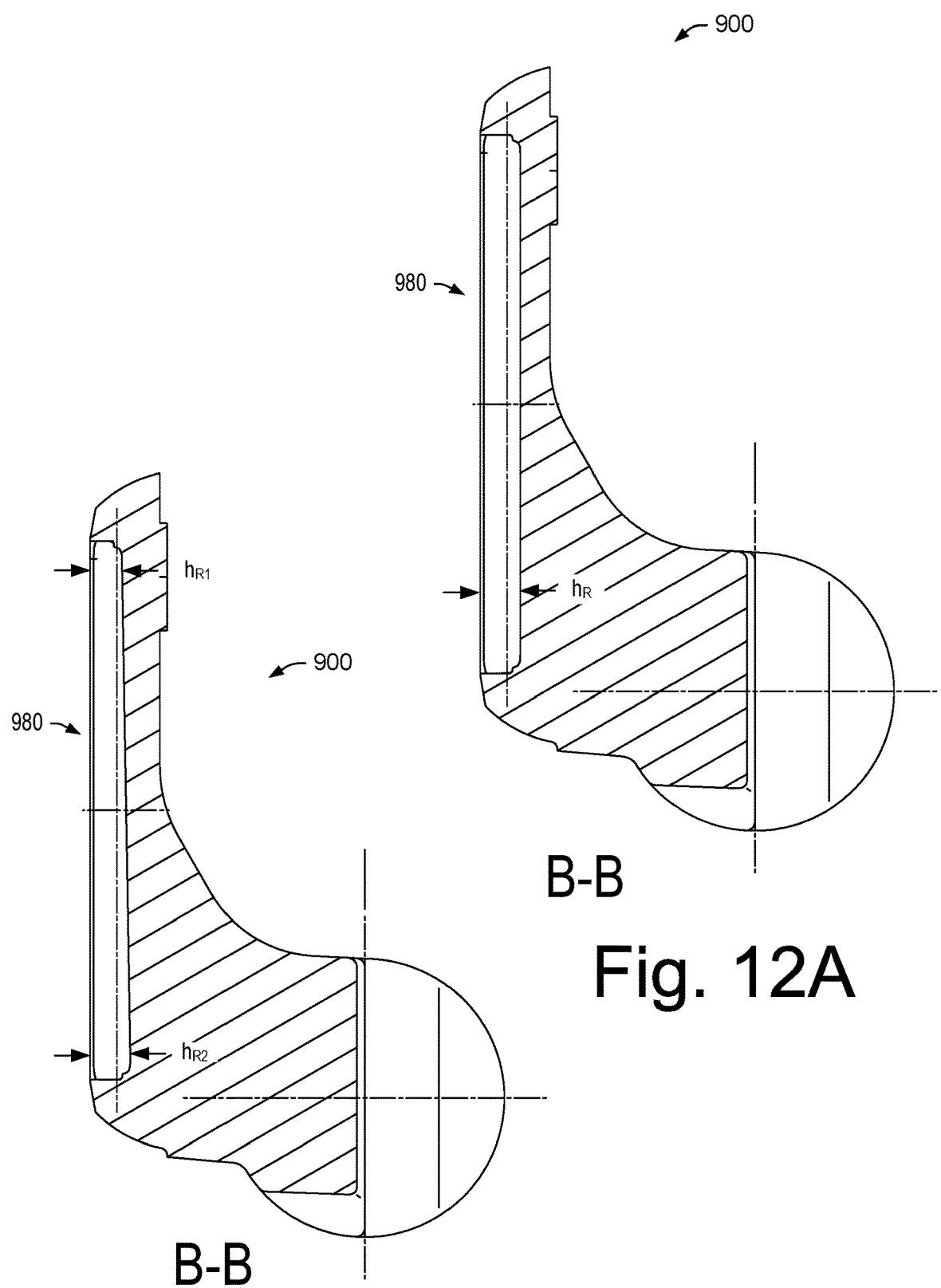
FIG. 12A and FIG. 12B are cross-sectional views of examples of the wastegate of FIG. 9 along a line B-B.

FIG. 12A and FIG. 12B show cross-sectional views of the wastegate 900 along a line B-B, as represented in the view of FIG. 10. The recess 980 can be seen in cross-section along a long axis, which is an axis to be aligned with a divider wall of a turbine housing. As mentioned, the recess 980 can be utilized to secure a mesh.

In the example of FIG. 12A, the depth of the recess 980 (e.g., recess height, $h_R$) can be relatively constant over the length of the recess 980 while in the example of FIG. 12B, the depth of the recess 980 (e.g., recess heights $h_{R1}$ and $h_{R2}$) can vary. In the example of FIG. 12B, the variation in depth of the recess 980 can be configured to expose less of a mesh at an end of the recess 980 that is closer to the axis of rotation of the shaft and to expose more of the mesh at an end of the recess 980 that is distal to the axis of the shaft. For example, in FIG. 12B, the depth $h_{R2}$ is greater than the depth $h_{R1}$. Such an approach may accommodate geometry of a transition from an open to a closed state where a portion of the mesh approaches and contacts a divider wall surface before another portion of the mesh. For example, in FIG. 8, the portion of the mesh 790 that is proximate to the axis of the shaft may contact the divider wall surface 617 before the portion of the mesh 790 that is distal to the axis of the shaft. As an example, an inclined recess as shown in FIG. 12B can help to reduce compression of one portion of a mesh with respect to another portion of a mesh, which may otherwise result in uneven loading across the mesh and/or increased resistance to closing of a wastegate (e.g., as may commence at the angle of approximately 3 degrees in the examples of FIG. 8).

Figure 13:
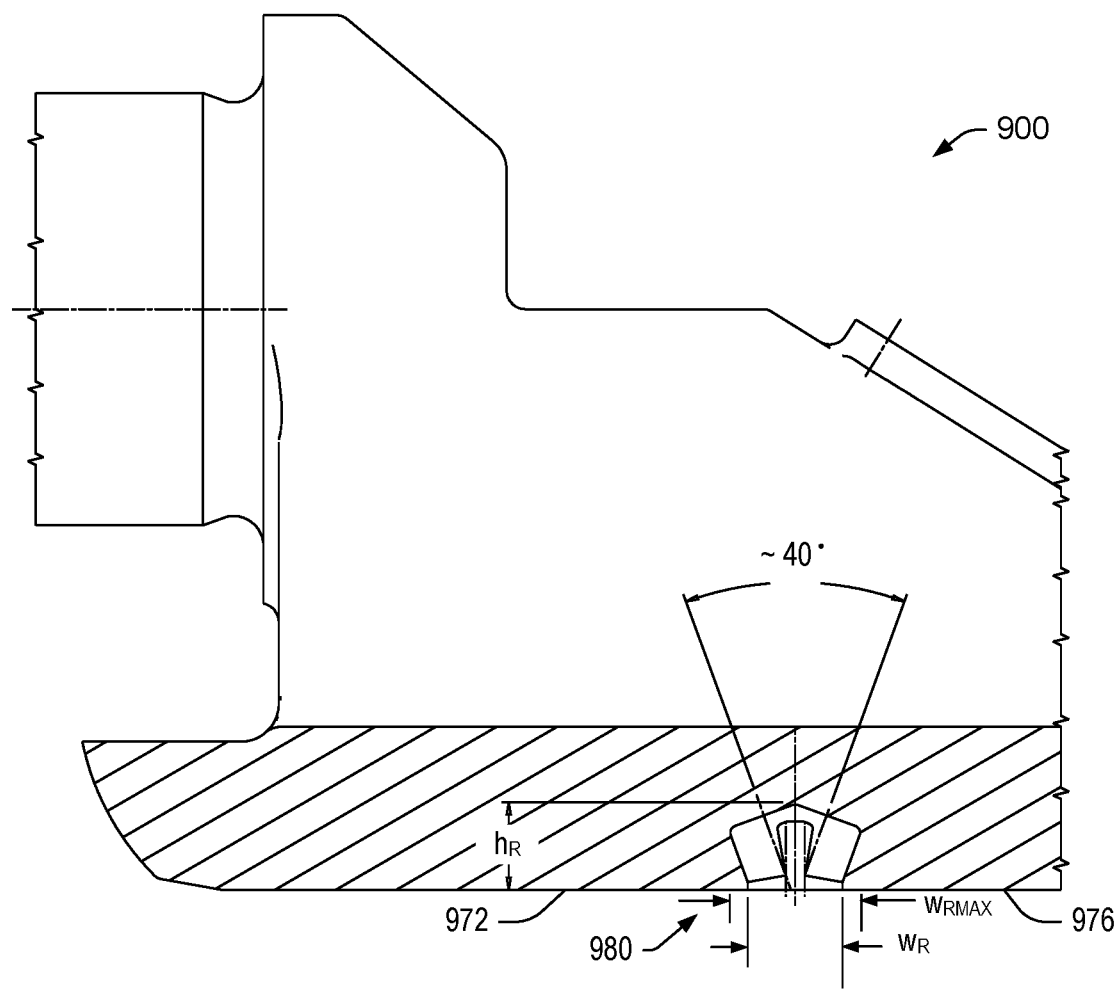
FIG. 13 is a cross-sectional view of the wastegate of FIG. 9 along a line C-C.

FIG. 13 shows another cross-sectional view of the wastegate 900 along a line C-C, as represented in the view of FIG. 10. As shown in FIG. 13, the recess 980 can include two halves, which may be symmetric and rotated with respect to each other by approximately 40 degrees. As shown, the cross-sectional profile of the recess 980 in the cross-wise shorter dimension can be approximately pentagonal where the base may be slightly inset from a lower surface of the plug 960 of the wastegate 900. As shown, the recess 980 can include a plane of symmetry, which may be imparted via machining of the recess 980 into the plug 960. FIG. 13 shows a mouth or neck of the recess 980 (e.g., an opening of the recess 980) that has a dimension $w_R$, noting that the widthwise dimension of the recess 980 can increase inside the plug 960. For example, in FIG. 13, a widthwise dimension $w_{RMAX}$ is shown. As to the dimension $h_R$, it is shown as a depth of the recess 980 where widthwise dimension can vary from the surface 972 and 976 of the plug 960 to the maximum depth, $h_R$.

Figure 14:
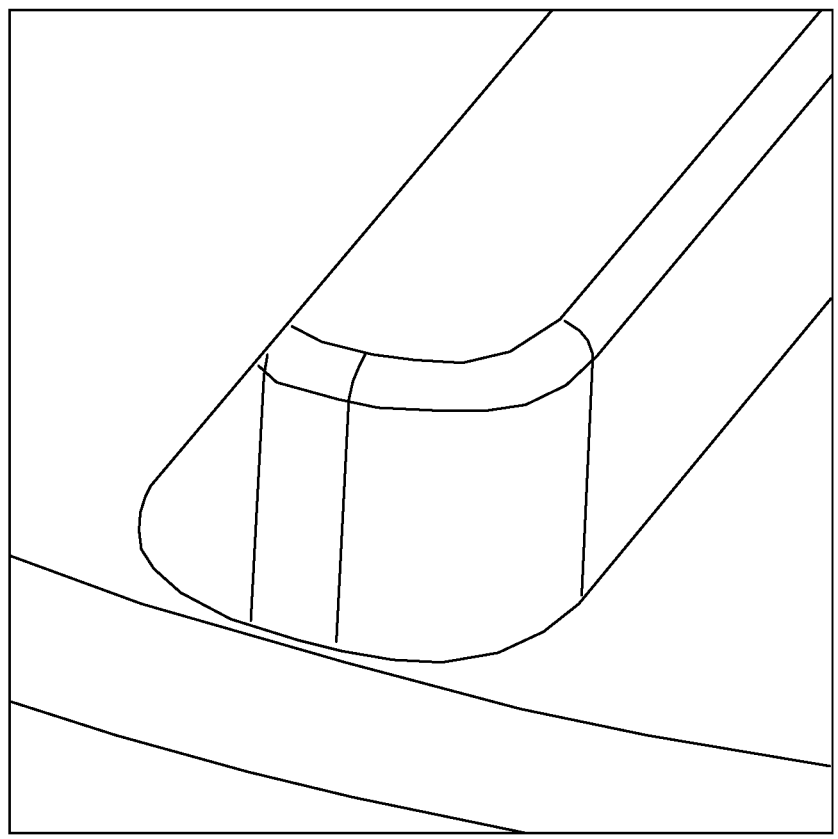
FIG. 14 is a series of views of an example of a recess of a plug per a machining method.
Figure 15:
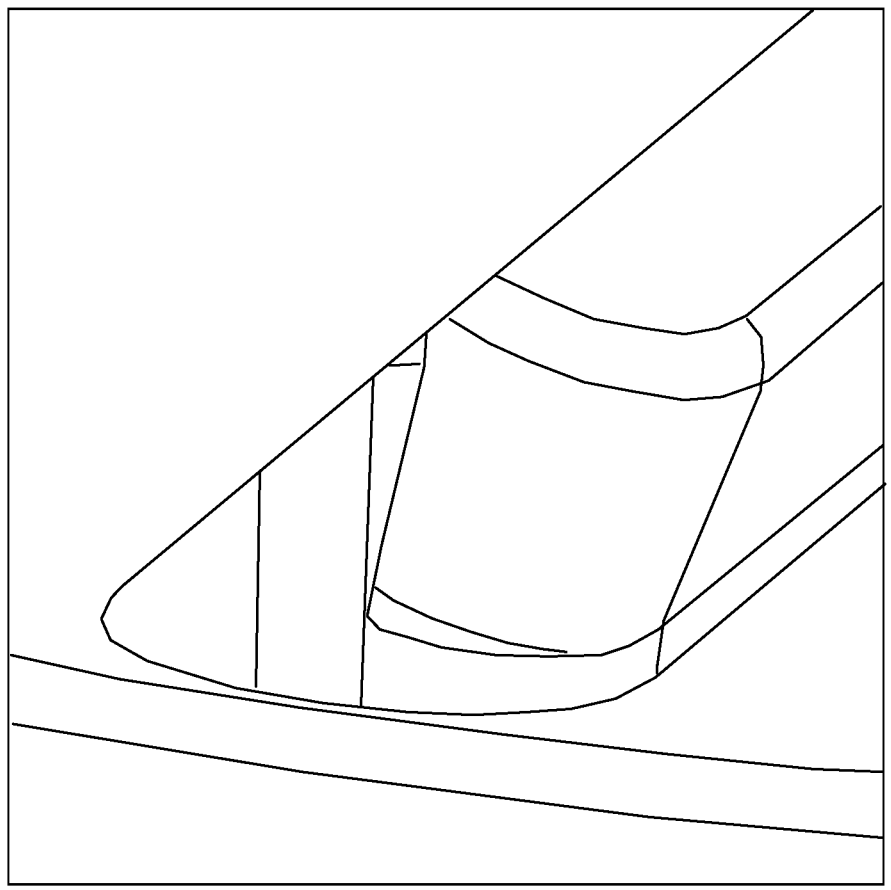
FIG. 15 is a series of views of an example of a recess of a plug per further machining of the machining method.
Figure 16:
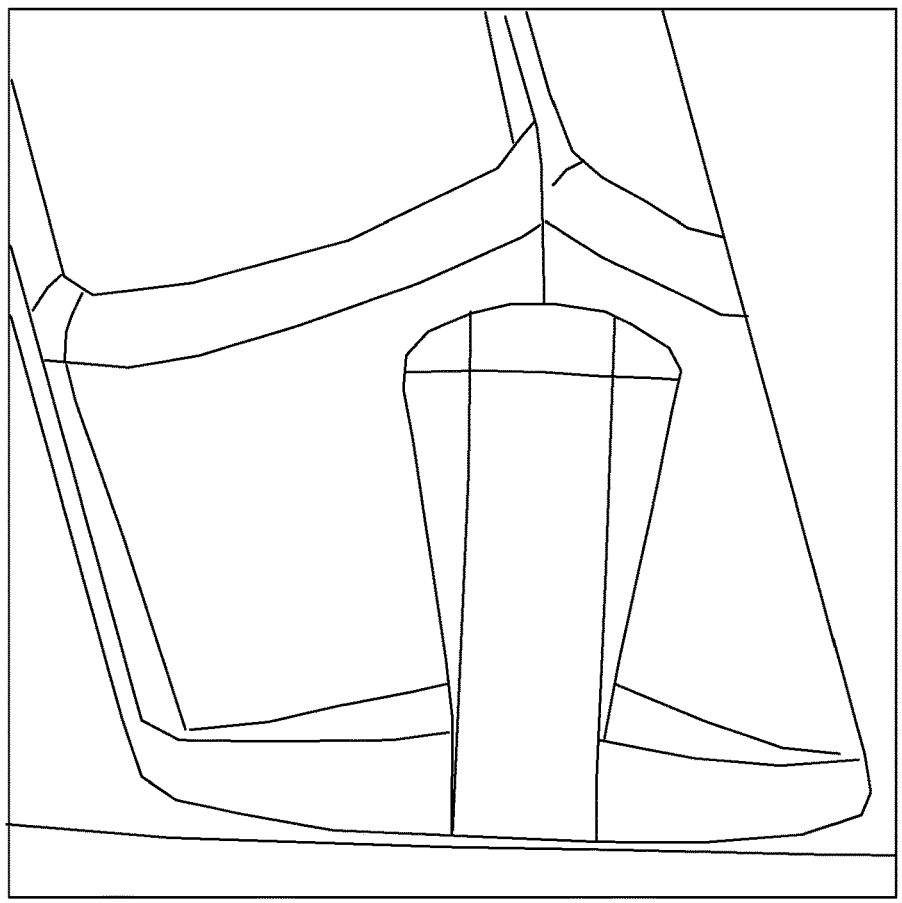
FIG. 16 is a series of views of an example of a recess of a plug per further machining of the machining method.
Figure 16:
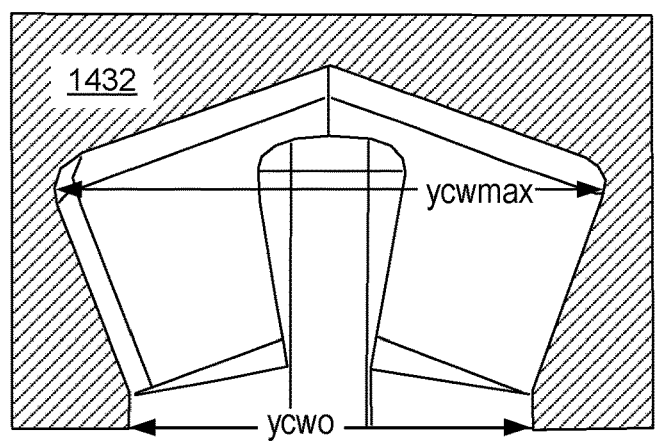

FIGS. 14, 15 and 16 show an example of a machining method for machining a recess into a plug of a wastegate. As shown in FIG. 14, a first machining process 1410 can machine a groove into the plug of a wastegate. As shown in FIG. 15, a second machining process 1420 can machine an offset crown into the plug of the wastegate. As shown in FIG. 16, a third machining process 1430 can machine another offset crown into the plug of the wastegate, where a cross-sectional view 1432 is shown.

As shown, a recess can include an interior dimension that is larger than an opening of the recess. For example, as shown in FIG. 16, the two crowns can provide a cross-wise dimension ycwmax that is larger than a cross-wise dimension ycwo of the opening of the recess. Such an approach can provide for fitting a portion of a mesh into the recess via compression of the mesh to fit through the opening such that the mesh expands and applies a force to the walls of the recess to retain the mesh and whereby removal of the mesh would require recompression to squeeze the mesh through the opening.

As an example, a recess of a plug can include a cross-wise interior dimension that is larger than a cross-wise opening dimension such that a mesh may be narrowest in its cross-wise dimension at the opening. In such an example, the mesh can have a waist that is defined by a portion of the mesh that is received in the recess and a portion of the mesh that is exterior to the recess. In such an example, the portion of the mesh that is exterior to the recess can be utilized to hinder flow in a gap between exhaust passages of a turbine housing.

Figure 17:
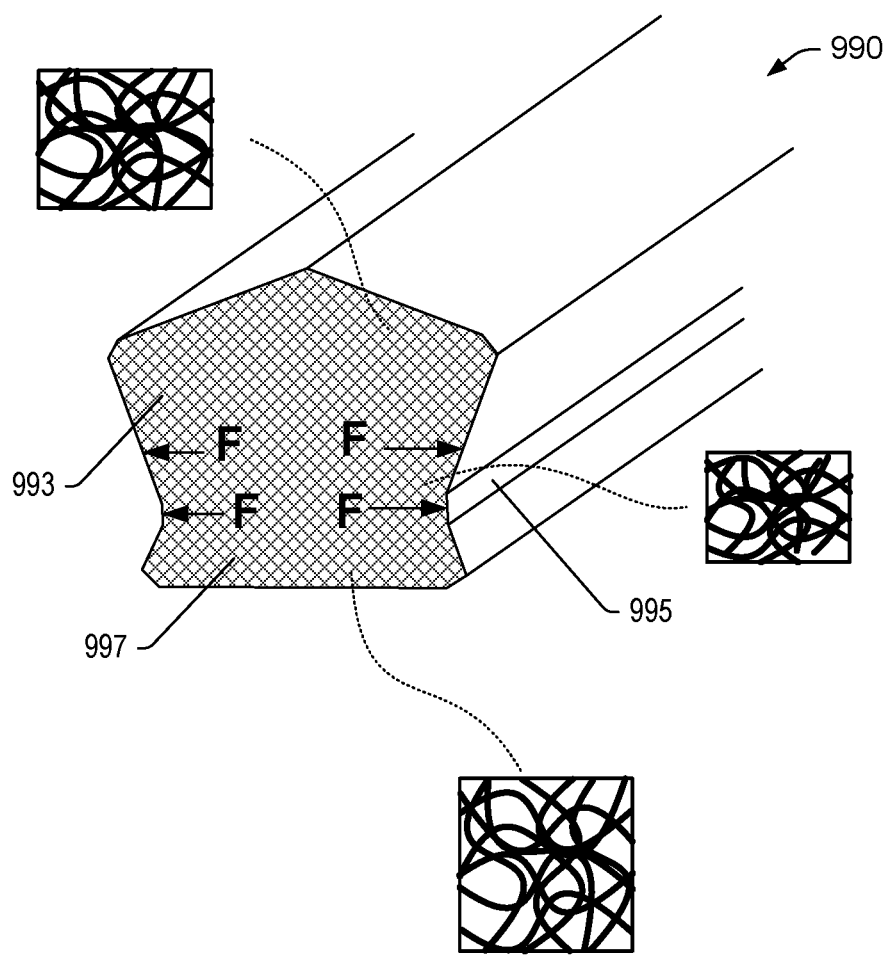
FIG. 17 is an approximate perspective view of a portion of an example of a mesh.

FIG. 17 shows an example of a mesh 1790 as may be received at least in part in a recess of a plug where the shape of the mesh 1790 is shown in FIG. 17 as it may be deformed by being in such a recess. As illustrated, the mesh 1790 includes a recessed portion 1793, a waist portion 1795 and an exterior portion 1797. In the example of FIG. 17, the recessed portion 1793 and the waist portion 1795 can be disposed in the recess or a plug while the exterior portion 1797 can be exposed by being exterior to the plug. FIG. 17 also shows various arrows that represent forces that may be applied to surfaces of a recess to help to secure the mesh 1790 in the recess. FIG. 17 also shows approximate enlarged views of wire mesh that include three different states where the recessed portion 1793 is compressed, the waist portion 1795 is more compressed and the exterior portion 1797 is substantially uncompressed (e.g., in a substantially free-standing state).

As an example, a mesh can include a recessed portion that is greater than approximately 50 percent of the mesh and an exposed portion that is less than approximately 50 percent of the mesh.

Figure 18:
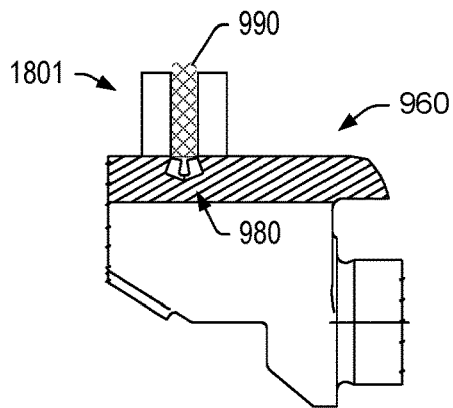
FIG. 18 is a block diagram of an example of a method for producing an assembly that includes a plug with a mesh in a recess of the plug.
Figure 18:
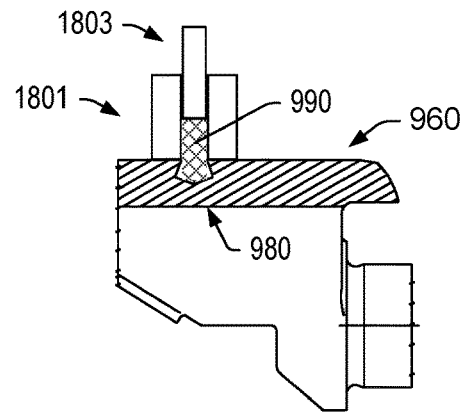
Figure 18:
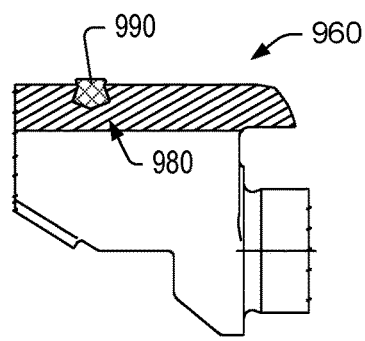

FIG. 18 shows an example of a method 1800 that includes a tool block 1810 for using a tool to position a mesh with respect to a recess of a plug; a compression block 1820 for compressing the mesh to force a portion of the mesh into the recess of the plug; and a production block 1830 for producing an assembly that includes the plug with the mesh disposed at least in part in the recess of the plug. The method 1800 is shown with respect to diagrams that provide a cutaway view of a portion of the plug 960 to expose the recess 980 and the mesh 990 as it is being processed to form the assembly. In FIG. 18, a tool 1801 can help to position the mesh 990 and a tool 1803 can be utilized to compress the mesh 990 to fit at least a portion of the mesh 990 in the recess 980. As an example, a cutting or trimming tool may be utilized to cut or trim the mesh 990 at one or more times during performance of the method 1800. As an example, a cutting or trimming tool may be utilized to achieve a desired mesh height and/or mesh shape as to the portion of the mesh 990 that extends outwardly from the recess 980 where such portion is, in a closed state of the plug 960 with respect to a wastegate seat, at least in part in contact with a divider wall that is disposed between two exhaust gas passages.

FIG. 19 shows an example plot 1900 of engine torque in newton-meters (Nm) versus engine speed in revolutions per minute (RPM). The plot 1900 includes baseline data, mesh with high stiffness data at overlap "A", mesh with high stiffness data at no overlap and mesh with high stiffness data at overlap "B". Overlap refers to a widthwise dimension of the mesh with respect to the divider wall. As an example, an overlap may be selected to achieve a desired performance. As shown, use of a mesh can increase engine torque over a range of engine speeds.

As an example, an assembly can include a turbine housing that includes a bore, a wastegate seat, wastegate passages that extend to the wastegate seat and a divider wall disposed between the wastegate passages where the divider wall includes a divider wall surface; a rotatable wastegate shaft configured for receipt by the bore; a wastegate arm extending from the wastegate shaft; and a wastegate plug extending from the wastegate arm where the wastegate plug includes a contact portion that contacts the wastegate seat to cover the wastegate passages in a closed state and a mesh that contacts the divider wall surface in the closed state. In such an example, the mesh can be a wire mesh. As an example, a wire mesh can be made of an alloy, which can be a nickel based alloy, a cobalt based alloy or another type of alloy. As an example, a mesh can be made of a nickel-chromium alloy.

As an example, a wastegate plug can include a recess where a portion of a mesh is disposed in the recess. In such an example, the portion of the mesh disposed in the recess can be greater than 50 percent of the mesh. A recess can include an opening where mesh protrudes from the recess via the opening. In a closed state of a plug that includes a portion of a mesh in a recess, another portion of the mesh that protrudes from the recess can contact a divider wall that is disposed between two exhaust passages. In the closed state, the mesh can hinder flow of exhaust from one of the exhaust passages to the other exhaust passage and, for example, vice versa.

As an example, a recess can include an interior portion and an opening where the interior portion includes a cross-wise dimension that exceeds a cross-wise dimension of the opening. In such an example, a mesh can be pinched in the recess where the mesh includes a waist that is due to a mouth or neck of the recess.

As an example, a wastegate arm and a wastegate plug can be formed as a unitary piece, for example, from a stock single piece of material via machining or, for example, via casting. In such an example, a mesh can be a separate piece that is fit to the wastegate plug. As an example, a wastegate shaft, a wastegate arm and a wastegate plug can be formed as a unitary piece, for example, from a stock single piece of material via machining or, for example, via casting. In such an example, a mesh can be a separate piece that is fit to the wastegate plug.

As an example, each of two wastegate passages can have a corresponding opening defined in part by a divider wall.

As an example, in a closed state, a mesh can reduce flow of exhaust from one of two wastegate passages to the other of the two wastegate passages. In such an example, an assembly can be operatively coupled to an internal combustion engine where the reduction in flow of exhaust increases torque of the internal combustion engine.

As an example, a contact portion of a wastegate plug can include a profile defined by a portion of a torus. As an example, a wastegate seat can include a profile defined by a portion of a cone. As an example, a wastegate plug can include a profile defined by a portion of a torus and a wastegate seat can include a profile defined by a portion of a cone where the profiles contact to form a contact perimeter in a closed state of the wastegate plug with respect to the wastegate seat.

As an example, in an open state of a wastegate plug with respect to a wastegate seat, a mesh can include a compressed interior portion disposed in a recess of the wastegate plug and an uncompressed exposed portion. In such an example, in a closed state, the exposed portion is compressed by contact with the divider wall surface. In such an example, the compressed exposed portion of the closed state includes a void space that is less than a void space of the uncompressed exposed portion of the open state.

As an example, a method can include rotating a wastegate plug to cover wastegate passages separated by a divider wall that includes a divider wall surface; compressing a portion of a mesh fit to the wastegate plug via contact between the portion of the mesh and the divider wall surface; and hindering flow of exhaust from one of the wastegate passages to another one of the wastegate passages via the compressed portion of the mesh. Such a method can include increasing engine torque with respect to engine speed of an internal combustion engine by decreasing scroll-to-scroll leakage of exhaust (e.g., passage-to-passage leakage of exhaust).

Although some examples of methods, devices, systems, arrangements, etc., have been illustrated in the accompanying Drawings and described in the foregoing Detailed Description, it will be understood that the example embodiments disclosed are not limiting, but are capable of numerous rearrangements, modifications and substitutions.

What is claimed is:

1. An assembly comprising:
   a turbine housing that comprises a bore, a wastegate seat, wastegate passages that extend to the wastegate seat and a divider wall disposed between the wastegate passages wherein the divider wall comprises a divider wall surface;
   a rotatable wastegate shaft configured for receipt by the bore;
   a wastegate arm extending from the wastegate shaft; and
   a wastegate plug extending from the wastegate arm wherein the wastegate plug comprises a contact portion that contacts the wastegate seat to cover the wastegate passages in a closed state and wherein the wastegate plug comprises a mesh that contacts the divider wall surface in the closed state.

2. The assembly of claim 1 wherein the mesh is a wire mesh.

3. The assembly of claim 2 wherein the mesh comprises a nickel-chromium alloy.

4. The assembly of claim 1 wherein the wastegate plug comprises a recess wherein a portion of the mesh is disposed in the recess.

5. The assembly of claim 4 wherein the portion of the mesh disposed in the recess is greater than 50 percent of the mesh.

6. The assembly of claim 4 wherein the recess comprises an opening and wherein the mesh protrudes from the recess via the opening.

7. The assembly of claim 1 wherein the recess comprises an interior portion and an opening wherein the interior portion comprises a cross-wise dimension that exceeds a cross-wise dimension of the opening.

8. The assembly of claim 1 wherein the wastegate arm and the wastegate plug are a unitary piece.

9. The assembly of claim 8 wherein the mesh is a separate piece that is fit to the wastegate plug.

10. The assembly of claim 1 wherein the wastegate shaft, the wastegate arm and the wastegate plug are a unitary piece.

11. The assembly of claim 10 wherein the mesh is a separate piece that is fit to the wastegate plug.

12. The assembly of claim 1 wherein each of the wastegate passages comprises a corresponding opening defined in part by the divider wall.

13. The assembly of claim 1 wherein, in the closed state, the mesh reduces flow of exhaust from one of the wastegate passages to another of the wastegate passages.

14. The assembly of claim 13 operatively coupled to an internal combustion engine wherein the reduction in flow of exhaust increases torque of the internal combustion engine.

15. The assembly of claim 1 wherein the contact portion of the wastegate plug comprises a profile defined by a portion of a torus.

16. The assembly of claim 1 wherein the wastegate seat comprises a profile defined by a portion of a cone.

17. The assembly of claim 1 wherein, in an open state of the wastegate plug with respect to the wastegate seat, the mesh comprises a compressed interior portion disposed in a recess of the wastegate plug and an uncompressed exposed portion.

18. The assembly of claim 17 wherein, in the closed state, the exposed portion is compressed by contact with the divider wall surface.

19. The assembly of claim 18 wherein the compressed exposed portion of the closed state comprises a void space that is less than a void space of the uncompressed exposed portion of the open state.

20. A method comprising:
- rotating a wastegate plug to cover wastegate passages separated by a divider wall that comprises a divider wall surface;
- compressing a portion of a mesh attached to the wastegate plug via contact between the portion of the mesh and the divider wall surface; and
- hindering flow of exhaust from one of the wastegate passages to another one of the wastegate passages via the compressed portion of the mesh.

* * * * *